(12) United States Patent
Zhu et al.

(10) Patent No.: US 12,219,458 B2
(45) Date of Patent: Feb. 4, 2025

(54) DATA PACKET TRANSMISSION METHOD AND APPARATUS

(71) Applicant: HUAWEI TECHNOLOGIES CO., LTD., Guangdong (CN)

(72) Inventors: Yuanping Zhu, Shanghai (CN); Yulong Shi, Beijing (CN); Jing Liu, Shanghai (CN); Yibin Zhuo, Shenzhen (CN); Zhenzhen Cao, Boulogne Billancourt (FR); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 17/708,767

(22) Filed: Mar. 30, 2022

(65) Prior Publication Data
US 2022/0225209 A1  Jul. 14, 2022

Related U.S. Application Data

(63) Continuation of application No. PCT/CN2019/109728, filed on Sep. 30, 2019.

(51) Int. Cl.
*H04W 40/24* (2009.01)
(52) U.S. Cl.
CPC .................. *H04W 40/248* (2013.01)
(58) Field of Classification Search
CPC .................................. H04W 40/248
See application file for complete search history.

(56) References Cited

U.S. PATENT DOCUMENTS

| 2019/0223078 A1 | 7/2019 | Sirotkin et al. | |
| 2021/0235291 A1* | 7/2021 | Byun | H04W 28/0236 |
| 2021/0352522 A1* | 11/2021 | Hwang | H04W 28/0278 |

FOREIGN PATENT DOCUMENTS

| CN | 110035042 A | 7/2019 |
| RU | 2693848 C1 | 7/2019 |
| WO | 2019182694 A1 | 9/2019 |

OTHER PUBLICATIONS

3GPP TR 38.874 0.7.0 (Nov. 2018), "3rd Generation Partnership Project; Technical Specification Group Radio Access Network; Study on Integrated Access and Backhaul; (Release 15)," Nov. 2018, 111 pages.

Extended European Search Report issued in European Application No. 19947563.3 on Aug. 23, 2022, 11 pages.

(Continued)

*Primary Examiner* — Brenda H Pham
(74) *Attorney, Agent, or Firm* — Fish & Richardson P.C.

(57) ABSTRACT

A data packet transmission method and apparatus are provided. The method includes: An IAB donor determines first configuration information, where the first configuration information is used to indicate a first backhaul link BH RLC channel, and the first BH RLC channel is used to transmit a control protocol data unit PDU at a backhaul adaptation protocol BAP layer. The IAB donor sends the first configuration information to an IAB node. According to the foregoing procedure, the IAB donor indicates, by using the first configuration information, the IAB node to send the control PDU at the BAP layer through the first BH RLC channel, to implement bearer mapping when the IAB node needs to send the control PDU at the BAP layer.

15 Claims, 10 Drawing Sheets

(56) References Cited

OTHER PUBLICATIONS

Qualcomm, "CR to 38.300 on Integrated Access and Backhaul for NR," 3GPP TSG-RAN WG2 Meeting #107, R2-19xxxxx, Prague, Czech Republic, Aug. 26-30, 2019, 13 pages.
3GPP TS 38.300 V15.7.0 (Sep. 2019), "3rd Generation Partnership Project; Technical Specification Group Radio Access Network; NR; NR and NG-RAN Overall Description; Stage 2 (Release 15)," Sep. 2019, 99 pages.
3GPP TS 38.473 V15.6.0 (Jul. 2019), "3rd Generation Partnership Project; Technical Specification Group Radio Access Network; NG-RAN; F1 application protocol (F1AP)(Release 15)," Jul. 2019, 220 pages.
Ericsson, "Backhaul Adaptation Protocol (BAP) Header Content," 3GPP TSG-RAN WG2 Meeting #106, R2-1906990, Reno, USA, May 13-17, 2019, 3 pages.
Ericsson, "draftCR TS 38.300 Mapping of Uplink Traffic to Backhaul RLC Channels," 3GPP TSG-RAN WG3 Meeting #105, R3-194693, Ljubljana, Slovenia, Aug. 26-30, 2019, 2 pages.
Huawei, HiSilicon, "BAP layer header content design," 3GPP TSG-RAN WG2 meeting #106, R2-1906985, Reno, Nevada, USA, May 13-17, 2019, 3 pages.
PCT International Search Report and Written Opinion issued in International Application No. PCT/CN2019/109728 on Jun. 30, 2020, 15 pages (with English translation).
Qualcomm Incorporated, "Integrated Access and Backhaul for NR," 3GPP TSG RAN meeting #85, RP-191864, Newport Beach, USA, Sep. 16-20, 2019, 22 pages.
Samsung, "Modelling of BAP layer," 3GPP TSG-RAN WG2 Meeting #106, R2-1906965, Reno, USA, May 13-17, 2019, 2 pages.
Qualcomm Incorporated, "IAB configuration of BAP-layer forwarding," 3GPP TSG-RAN WG2 Meeting #107, R2-1909642, Prague, Tcheque Republic, Aug. 26-30, 2019, 4 pages.
Huawei et al., "Bearer mapping for other traffic," 3GPP TSG-RAN WG2 Meeting #107, R2-1910329, Prague, Czech Republic, Aug. 26-30, 2019, 2 pages.
Huawei et al., "Bearer mapping decision and configuration details," 3GPP TSG-RAN WG2 Meeting#107, R2-1910344, Prague, Czech Republic, Aug. 26-30, 2019, 5 pages.
Samsung, "BAP configuration," 3GPP TSG-RAN WG2 Meeting #107, R2-1910372, Prague, Czech Republic, Aug. 26-30, 2019, 4 pages.
Qualcomm, "CR to 38.300 on Integrated Access and Backhaul for NR," 3GPP TSG-RAN WG2 Meeting #107, R2-1911546, Prague, Czech Republic, Aug. 26-30, 2019, 14 pages.
Qualcomm Incorporated (Rapporteur), "Offline 106: BAP configuration based on F1 to F7," 3GPP TSG-RAN WG2 Meeting #107, R2-1911796, Prague, Tcheque Republic, Aug. 26-30, 2019, 4 pages.
Samsung, "Further discussions on BH RLC CH configuration," 3GPP TSG-RAN WG2 Meeting #104, R3-192605, Reno, NV, USA, May 13-17, 2019, 5 pages.
Ericsson, "Signaling Aspects of BH RLC Channel and BAP Layer Configuration," 3GPP TSG-RAN WG3 Meeting #105, Ljubljana, Slovenia, R3-193734, Aug. 26-30, 2019, 5 pages.
Office Action in Japanese Appln. No. 2022-519832, dated Apr. 4, 2023, 10 pages (with English translation).
Nokia et al., "Discussion on RIM-RS configurations," 3GPP TSG RAN WG1 Ad-Hoc Meeting 1901, R1-1900838, Taipei, Taiwan, Jan. 21-25, 2019, 12 pages.
Office Action in Russian Appln. No. 2022111769, dated Feb. 10, 2023, 20 pages (with English translation).

\* cited by examiner

First data packet

Downlink data packet received by an IAB donor

DATA PACKET TRANSMISSION METHOD AND APPARATUS

CROSS-REFERENCE TO RELATED APPLICATIONS

This application is a continuation of an International Application No. PCT/CN2019/109728, filed on Sep. 30, 2019, which is hereby incorporated by reference in its entirety.

TECHNICAL FIELD

This application relates to the field of wireless communications technologies, and in particular, to a data packet transmission method and apparatus.

BACKGROUND

An integrated access and backhaul (IAB) network technology is introduced into a 5th generation (5G) mobile communications system. A wireless transmission solution is used for both an access link and a backhaul link in an IAB network, to avoid optical fiber deployment, so as to reduce deployment costs and improve deployment flexibility. The IAB network includes an IAB node and an IAB donor. A terminal side device may access the IAB node, and traffic data of the terminal side device may be transmitted from the IAB node to the IAB donor through a wireless backhaul link.

However, existing bearer mapping is mainly performed on an F1 user plane (F1-U) data payload and an F1 control plane (F1-C) data payload that are transmitted between an IAB node and a donor node on an F1 interface. Actually, there are other types of data payloads that need to be transmitted between the IAB node and the donor node, that is, data payloads other than the F1 user plane data payload and the F1 control plane data payload. These data payloads may be collectively referred to as a non-F1 traffic data payload. How to perform bearer mapping on the non-F1 traffic data packet on a wireless backhaul link is not involved in the conventional technology, and is a problem that needs to be resolved as soon as possible.

SUMMARY

Implementations of this application provide a data packet transmission method and apparatus, to resolve a corresponding problem of how to perform bear mapping for a data payload on a backhaul link.

According to a first aspect, an embodiment of this application provides a data packet transmission method, including: An IAB donor determines first configuration information, where the first configuration information is used to indicate a first BH RLC channel, and the first BH RLC channel is used to transmit a control PDU at a BAP layer. The IAB donor sends the first configuration information to an IAB node.

According to the foregoing procedure, the IAB donor indicates, by using the first configuration information, the IAB node to send the control PDU at the BAP layer through the first BH RLC channel, to implement bearer mapping when the IAB node needs to send the control PDU at the BAP layer.

In a possible implementation, the first configuration information includes a channel identifier of the first BH RLC channel; or the first configuration information includes a logical channel identifier, and a logical channel indicated by the logical channel identifier corresponds to the first BH RLC channel.

According to a second aspect, a data packet transmission method is provided, and includes: An IAB node determines a first BH RLC channel used to transmit a control PDU at a BAP layer. The IAB node sends the control PDU at the BAP layer to an adjacent node of the IAB node through the first BH RLC channel.

According to the foregoing procedure, an IAB donor indicates, by using first configuration information, the IAB node to send the control PDU at the BAP layer through the first BH RLC channel, to implement bearer mapping when the IAB node needs to send the control PDU at the BAP layer.

In a possible implementation, that an IAB node determines a first backhaul link BH RLC channel used to transmit a control PDU at a BAP layer includes: The IAB node obtains first configuration information from an IAB donor, where the first configuration information is used to indicate the first BH RLC channel used to transmit the control PDU at the BAP layer. The IAB node determines the first BH RLC channel based on the first configuration information.

In a possible implementation, the first configuration information includes a channel identifier of the first BH RLC channel; or the first configuration information includes a logical channel identifier, and a logical channel indicated by the logical channel identifier corresponds to the first BH RLC channel.

According to a third aspect, a data packet transmission method is provided, and includes: An IAB donor determines second configuration information, where the second configuration information is used to indicate a second backhaul link BH radio link control RLC channel, the second BH RLC channel is used to transmit a first-type data payload, and the first-type data payload is a data payload other than an F1 user plane F1-U data payload and an F1 control plane F1-C data payload. The IAB donor sends the second configuration information to an IAB node.

According to the foregoing procedure, the IAB donor indicates, by using the second configuration information, the IAB node to send the first-type data payload through the second BH RLC channel, to implement bearer mapping on the first-type data payload.

In a possible implementation, the first-type data payload includes any one of the following:

an operation, administration, and maintenance OAM traffic packet; a packet used to request an internet protocol IP address; a packet used to establish an internet protocol security IPsec transmission channel; a stream control transport protocol SCTP association setup packet; an SCTP association shutdown packet; and an SCTP association heartbeat packet.

In a possible implementation, the second configuration information includes any one or more of the following:

a first type, where the first type is a type of a data payload, and the first type corresponds to the second BH RLC channel; first differentiated service information, where the first differentiated service information corresponds to the first type and/or the second BH RLC channel; and a first flow label, where the first flow label corresponds to the first type and/or the second BH RLC channel.

In a possible implementation, the method further includes: The IAB donor generates a first data payload, where the first data payload is the first-type data payload. If packet header information corresponding to the first data payload carries the first differentiated service information, the IAB donor sends a first data packet to the IAB node through the second BH RLC channel corresponding to the first differentiated service information; or if packet header information corresponding to the first data payload carries the first flow label, the IAB donor sends a first data packet to the IAB node through the second BH RLC channel corresponding to the first flow label, where the first data packet includes the first data payload.

In a possible implementation, the second configuration information includes identification information used to identify the second BH RLC channel, and the identification information is a channel identifier of the second BH RLC channel, or the identification information is a logical channel identifier corresponding to the second BH RLC channel.

According to a fourth aspect, a data packet transmission method is provided, and includes: An IAB node receives second configuration information from an IAB donor, where the second configuration information is used to indicate a second backhaul link BH radio link control RLC channel, the second BH RLC channel is used to transmit a first-type data payload, and the first-type data payload is a data payload other than an F1 user plane F1-U data payload and an F1 control plane F1-C data payload. The IAB node transmits the first-type data payload based on the second configuration information.

According to the foregoing procedure, the IAB node determines, by using the second configuration information sent by the IAB donor, that the first-type data payload is sent through the second BH RLC channel, to implement bearer mapping on the first-type data payload.

In a possible implementation, the first-type data payload includes any one of the following:
  an operation, administration, and maintenance OAM traffic packet; a packet used to request an internet protocol IP address; a packet used to establish an internet protocol security IPsec transmission channel; a stream control transport protocol SCTP association setup packet; an SCTP association shutdown packet; and an SCTP association heartbeat packet.

In a possible implementation, the second configuration information includes any one or more of the following:
  a first type, where the first type is a type of a data payload, and the first type corresponds to the second BH RLC channel; first differentiated service information, where the first differentiated service information corresponds to the first type and/or the second BH RLC channel; and a first flow label, where the first flow label corresponds to the first type and/or the second BH RLC channel.

In a possible implementation, the second configuration information includes identification information used to identify the second BH RLC channel, and the identification information is a channel identifier of the second BH RLC channel, or the identification information is a logical channel identifier corresponding to the second BH RLC channel.

According to a fifth aspect, a data packet transmission method is provided, and includes: An IAB donor determines a first label based on packet header information corresponding to a third data payload, where the first label is used to determine an egress radio link control RLC channel of the third data payload. The IAB donor sends a third data packet to an IAB node, where the third data packet includes the third data payload and a first backhaul adaptation protocol BAP layer header, and the first BAP layer header includes the first label.

According to the foregoing procedure, the IAB donor uses the first label to indicate the egress radio link control RLC channel of the third data payload, and no longer determines the egress RLC channel of the third data payload based on only an ingress RLC channel of the third data payload, to implement flexible transmission of the third data payload.

In a possible implementation, that an IAB donor determines a first label based on packet header information corresponding to a third data payload includes:

The IAB donor obtains third configuration information. The IAB donor determines the first label based on the packet header information corresponding to the third data payload and the third configuration information, where the third configuration information is used to configure a correspondence between first information in the packet header information and the first label, and the first information includes any one or more of the following:
  first differentiated service information, a first flow label, and a first internet protocol IP address.

According to a sixth aspect, a data packet transmission method is provided, and includes: A second IAB node obtains a fourth data payload. The second IAB node determines a second label based on packet header information corresponding to the fourth data payload or a message type corresponding to the fourth data payload, where the second label is used to determine an egress radio link control RLC channel of the fourth data payload. The second IAB node sends a fourth data packet to a first IAB node, where the fourth data packet includes the fourth data payload and a second backhaul adaptation protocol BAP layer header, and the second BAP layer header includes the second label.

In a possible implementation, that the second IAB node determines a second label based on packet header information corresponding to the fourth data payload includes:

The second IAB node receives fourth configuration information from an IAB donor.

The second IAB node determines the second label based on the packet header information corresponding to the fourth data payload and the fourth configuration information.

The fourth configuration information is used to configure a correspondence between second information in the packet header information and the second label, and the second information includes any one or more of the following:
  second differentiated service information in the packet header information, a second flow label in the packet header information, a second IP address in the packet header information, data radio bearer information that is in the packet header information and that corresponds to the fourth data payload, a second type of the fourth data payload, and a stream identifier at an SCTP layer that carries an F1AP message when the fourth data payload is the F1AP message.

In a possible implementation, that the second IAB node determines a second label based on a message type corresponding to the fourth data payload includes:

The second IAB node receives fourth configuration information from an IAB donor.

The second IAB node determines the second label from the fourth configuration information based on the message type corresponding to the fourth data payload.

The fourth data payload is a control plane F1 application protocol F1AP message, and the fourth configuration information includes one or more of the following:
  a second type of the fourth data payload and a second label corresponding to the second type, where the second type is any one or more of F1AP message types:
  a stream identifier at an SCTP layer that carries the F1AP message when the fourth data payload is the F1AP message, and a second label corresponding to the stream identifier.

According to a seventh aspect, a data packet transmission method is provided, and includes:

A first integrated access and backhaul IAB node obtains a data packet, where the data packet is a data packet from a second IAB node or a data packet from an IAB donor, a backhaul adaptation protocol BAP layer header of the data packet includes a third label, and the third label is used to determine an egress radio link control RLC channel of the data packet.

The first IAB node determines a third RLC channel identifier based on the third label, where the third RLC channel identifier is an identifier of the egress RLC channel of the data packet.

The first IAB node sends the data packet through the egress RLC channel corresponding to the third RLC channel identifier.

In a possible implementation, that the first IAB node determines a third RLC channel identifier based on the third label includes:

The first IAB node receives fifth configuration information from the IAB donor, where the fifth configuration information is used to configure a correspondence between the third label and the third RLC channel identifier.

The first IAB node determines, as the third RLC channel identifier, an RLC channel identifier that is in the fifth configuration information and that corresponds to the third label.

Alternatively, the first IAB node determines, as the third RLC channel identifier, an RLC channel identifier that is in the fifth configuration information and that corresponds to the third label and a fourth RLC channel identifier, where the fourth RLC channel identifier is an identifier of an ingress RLC channel for receiving the data packet.

Alternatively, the first IAB node determines, from the fifth configuration information, a first quality of service QoS identifier corresponding to the third label, and determines, as the third RLC channel identifier, an RLC channel identifier that is in the fifth configuration information and that corresponds to the first QoS identifier.

Alternatively, the first IAB node determines, from the fifth configuration information, a first QoS parameter corresponding to the third label, and determines, as the third RLC channel identifier, an RLC channel identifier that is in the fifth configuration information and that corresponds to the first QoS parameter.

In a possible implementation, the fifth configuration information includes any one or more of the following:

- a correspondence between the third label and the third RLC channel identifier;
- a correspondence between the third label, the fourth RLC channel identifier, and the third RLC channel identifier;
- a correspondence between the third label and a quality of service QoS identifier;
- a correspondence between the QoS identifier and the third RLC channel identifier;
- a correspondence between the third label and a QoS parameter; and
- a correspondence between the QoS parameter and the third RLC channel identifier.

According to an eighth aspect, this application further provides a communications apparatus. The communications apparatus has a function of implementing any method provided in any one of the foregoing aspects. The communications apparatus may be implemented by hardware, or may be implemented by hardware executing corresponding software. The hardware or the software includes one or more units corresponding to the foregoing function.

In a possible implementation, the communications apparatus includes a processor, and the processor is configured to support the communications apparatus in performing corresponding functions of the first IAB node, the second IAB node, the IAB donor, or the IAB node in the foregoing method. The communications apparatus may further include a memory, and the memory may be coupled to the processor, and stores program instructions and data that are necessary for the communications apparatus. Optionally, the communications apparatus further includes a communications interface, and the communications interface is configured to support communication between the communications apparatus and a device such as the first IAB node, the second IAB node, the IAB donor, or the IAB node.

In a possible implementation, the communication apparatus includes corresponding functional units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communications apparatus includes a processing unit and a communications unit. These units may perform corresponding functions in the foregoing method examples. For details, refer to descriptions in the method according to any one of the foregoing aspects. The details are not described herein again.

According to a ninth aspect, this application provides a communications apparatus, including a processor and a memory. The memory is configured to store computer-executable instructions, and when the apparatus runs, the processor executes the computer-executable instructions stored in the memory, so that the apparatus performs the methods in the foregoing aspects.

According to a tenth aspect, this application provides a communications apparatus, including a unit or a means configured to perform the steps in the foregoing aspects.

According to an eleventh aspect, this application provides a communication apparatus, including a processor and a communications interface. The processor is configured to: communicate with another apparatus through the communications interface, and perform the methods in the foregoing aspects. There are one or more processors.

According to a twelfth aspect, this application provides a communications apparatus, including a processor, configured to: connect to at least one memory, and invoke a program stored in the at least one memory, to perform the methods in the foregoing aspects. The at least one memory may be located inside the apparatus, or may be located outside the apparatus. In addition, there are one or more processors.

According to a thirteenth aspect, this application further provides a computer-readable storage medium. The computer-readable storage medium stores instructions, and when the instructions are run on a computer, the computer is enabled to perform the methods in the foregoing aspects.

According to a fourteenth aspect, this application further provides a computer program product including instructions, and when the computer program product runs on a computer, the computer is enabled to perform the methods in the foregoing aspects.

According to a fifteenth aspect, this application further provides a chip system, including a processor, configured to perform the methods in the foregoing aspects.

According to a sixteenth aspect, this application further provides a chip system, including the first IAB node, the second IAB node, and the IAB donor that are provided above.

DESCRIPTION OF EMBODIMENTS

The following further describes in detail the embodiments of this application with reference to the accompanying drawings.

The embodiments of this application may be applied to various mobile communications systems, for example, a new radio (NR) system, a long term evolution (LTE) system, a long term evolution-advanced (LTE-A) system, an evolved long term evolution (eLTE) system, a future communications system, and another communications system. Specifically, this is not limited herein.

In the embodiments of this application, a terminal side device is a device having a wireless transceiver function or a chip that can be disposed in the device. The device having the wireless transceiver function may also be referred to as user equipment (UE), an access terminal, a subscriber unit, a subscriber station, a mobile station, a remote station, a remote terminal, a mobile device, a user terminal, a user agent, or a user apparatus. In actual application, the terminal side device in the embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, the device having the wireless transceiver function and the chip that can be disposed in the device are collectively referred to as the terminal side device.

In the embodiments of this application, a network side device may be a radio access device in various standards, for example, an evolved NodeB (evolved NodeB, eNB), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP) or transmission reception point (TRP). The network side device may alternatively be a gNB or a TRP or TP in a 5G (NR) system, one or a group of antenna panels (including a plurality of antenna panels) of a base station in a 5G system, a network node that constitutes a gNB or a transmission point, for example, a BBU, a DU or a CU in a central unit-distributed unit (CU-DU) architecture, or the like.

In the embodiments of this application, an IAB scenario in a wireless communications network is used as an example to describe some scenarios. It should be noted that the solutions in the embodiments of this application may be further applied to another wireless communications network, and a corresponding name may also be replaced with a name of a corresponding function in the another wireless communications network.

Figure 1:
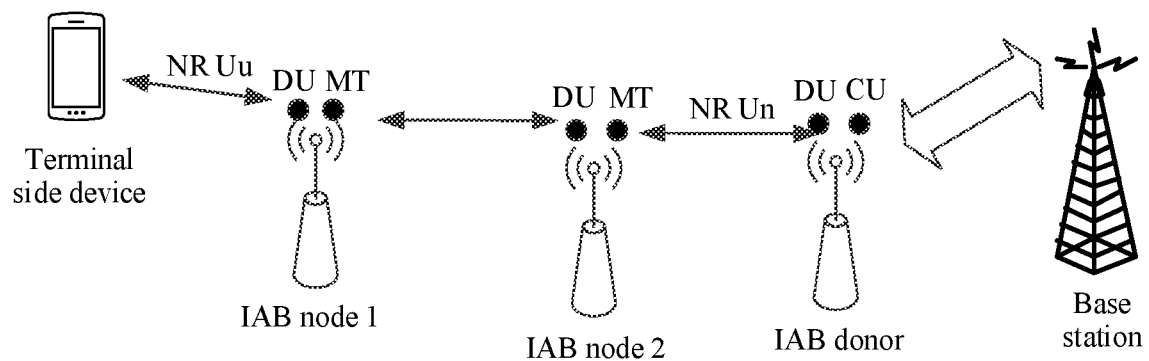
FIG. 1 is a schematic diagram of a communications system to which an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system to which an embodiment of this application is applicable. As shown in FIG. 1, the communications system includes a base station, an IAB donor, an IAB node 1, an IAB node 2, and a terminal side device.

In this embodiment of this application, a node that supports integrated access and backhaul is referred to as an IAB node, and the IAB node may also be referred to as a relay node (RN). For ease of description, both the node and the relay node are referred to as the IAB node below. The IAB node may provide a wireless access service for the terminal side device, and traffic data or control information of the terminal side device is transmitted from the IAB node to the IAB donor or another network side device through a wireless backhaul link. The IAB node may include at least one mobile terminal (MT) unit and at least one distributed unit (DU). In this embodiment of this application, only an example in which the IAB node includes one MT unit and one DU is used for description. The MT unit in the IAB node implements that the IAB node serves as a terminal to communicate with a parent node of the IAB node and the IAB donor. The DU in the IAB node provides an access service for a terminal side device or another IAB node attached to the DU, and may also communicate with the IAB donor through an F1 interface. The MT unit in the IAB node may also be referred to as an MT function entity in the IAB node, and the DU in the IAB node may also be referred to as a DU function entity in the IAB node. For ease of description, both the MT unit in the IAB node and the MT function entity in the IAB node are briefly referred to as an "IAB node MT", and both the DU in the IAB node and the DU function entity in the IAB node are briefly referred to as an "IAB node DU".

Figure 2:
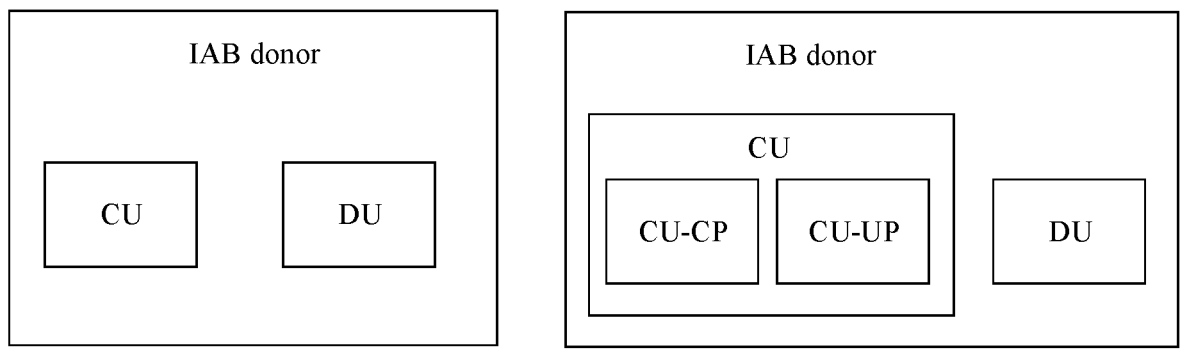
FIG. 2 is a schematic diagram of a structure of an IAB donor according to an embodiment of this application.

In this embodiment of this application, the IAB donor may be an access network element having a complete base station function, or may be an access network element in a form in which a centralized unit (CU) and a distributed unit (DU) are separated. For details, refer to FIG. 2. In FIG. 2, an IAB donor CU may alternatively be in a form in which a control plane (CP) and a user plane (UP) are separated. For example, one IAB donor CU includes one CU-CP and a plurality of CU-UPs. This is not limited in this embodiment of this application.

A CU in the IAB donor may also be referred to as a CU function entity in the IAB donor, and a DU in the IAB donor may also be referred to as a DU function entity in the IAB donor. For ease of description, in this embodiment of this application, the CU in the IAB donor and the CU function entity in the IAB donor are briefly referred to as an IAB donor CU, and the DU in the IAB donor and the DU function entity in the IAB donor are briefly referred to as an IAB donor DU.

In addition, FIG. 1 further shows names of interfaces between devices. For example, there are an NR Uu interface between the terminal side device and the IAB node 1 and an NR Un interface between the IAB node 2 and the IAB donor. The names of the interfaces are merely examples, and do not represent a limitation on the interface. When a version of the communications system changes, a corresponding name may also be replaced with a name of a corresponding function in another wireless communications network. In addition, when the base station is a base station in 5G, an interface between the IAB donor and the base station may be an Xn interface. When the base station is a base station in LTE, an interface between the IAB donor and the base station may be an X2 interface.

An IAB network shown in FIG. 1 supports multi-hop networking. For example, there is an intermediate IAB node (that is, the IAB node 2) between the IAB node 1 and the IAB donor shown in FIG. 1. In another possible networking scenario, the IAB node 1 may also be directly connected to the IAB donor without other intermediate IAB nodes, or there may be more than one intermediate IAB node between the IAB node 1 and the IAB donor.

The IAB network shown in FIG. 1 supports both multi-hop networking and multi-connection networking. At least one transmission path including a plurality of links may exist between the terminal side device served by the IAB node and the IAB donor. There may also be one or more transmission paths between the IAB node and the IAB donor, and each transmission path may include one or more IAB nodes. On a transmission path, each IAB node considers an adjacent node that provides a backhaul service for the IAB node as a parent node, and correspondingly, each IAB node may be considered as a child node of the parent node of the IAB node. For example, in the scenario shown in FIG. 1, a parent node of the IAB node 2 is the IAB donor, and the IAB donor considers the IAB node 2 as a child node.

In another possible non-standalone multi-connection networking scenario, the terminal side device served by the IAB node may establish a connection to the IAB node, and may also be directly connected to the base station (e.g. an evolved NodeB eNB in an LTE network) through a Uu interface in LTE. Similarly, the IAB node may be connected to the base station through the Uu interface in LTE, and may also be connected to the IAB donor through a one-hop or multi-hop NR wireless backhaul link. The IAB donor and the base station are connected through an X2 interface.

In this embodiment of this application, some technical terms may be used, for example, a previous-hop node of the node, a next-hop node of the node, an ingress link of the node, and an egress link of the node. The following first explains these technical terms.

Previous-hop node of a node: The previous-hop node of the node is the last node that is on a path including the node and that receives a data packet before the node.

Next-hop node of a node: The next-hop node of the node is the $1^{st}$ node that is on a path including the node and that receives a data packet after the node.

Ingress link of the node: The ingress link of the node is a link between the node and a previous-hop node of the node, and may also be referred to as a previous-hop link of the node.

Egress link of a node: The egress link of a node is a link between the node and a next-hop node of the node, and may also be referred to as a next-hop link of the node.

Parent node and child node: Each IAB node considers a node that provides a wireless access service and/or a wireless backhaul service for the IAB node as a parent node. Correspondingly, each IAB node may be considered as a child node of the parent node of the IAB node. Alternatively, the child node may also be referred to as a lower-level node, and the parent node may also be referred to as an upper-level node.

F1 interface: The F1 interface in this embodiment of this application is an interface between the IAB node DU and the IAB donor or the IAB donor CU. The F1 interface may also be referred to as a name such as an F1* interface. For ease of description, in this embodiment of this application, the interfaces may be collectively referred to as the F1 interface, but the name is not limited.

It should be noted that the F1 interface may also be an interface between function entities in a device. For example, for a base station including a DU and a CU, the F1 interface may be an interface between the DU in the base station and the CU in the base station.

In this embodiment of this application, the F1 interface supports a user plane protocol and a control plane protocol. For example, a user plane protocol layer of the F1 interface includes a general packet radio service (GPRS) tunneling protocol user plane (GTP-U) layer, a user datagram protocol (UDP) layer, and an internet protocol (IP) layer. Optionally, the user plane protocol layer of the F1 interface further includes a PDCP layer and/or an IP security (IPsec) layer.

For example, a control plane protocol layer of the F1 interface includes an F1 application protocol (F1AP) layer, a stream control transport protocol (SCTP) layer, and an IP layer. Optionally, the control plane protocol layer of the F1 interface further includes one or more of a PDCP layer, an IPsec layer, and a datagram transport layer security (DTLS) layer.

In addition, it should be understood that in this embodiment of this application, although "first", "second", "third", and the like may be added before the terms to describe various messages and information, for example, first configuration information, second configuration information, and third configuration information, "first", "second", "third", and the like are only used to distinguish between the messages, the information, and the like, and do not mean that the messages, the information, and the like are limited.

Figure 3A:
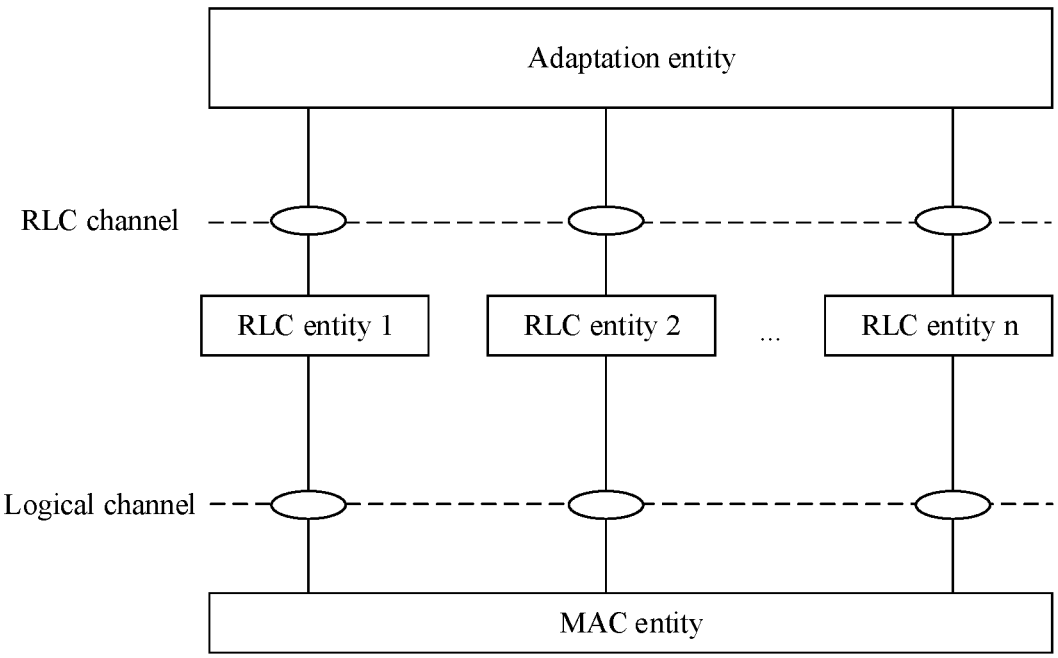
FIG. 3(a) and FIG. 3(b) each are a schematic diagram of a correspondence between an RLC channel, a logical channel, and a protocol entity according to an embodiment of this application.
Figure 3B:
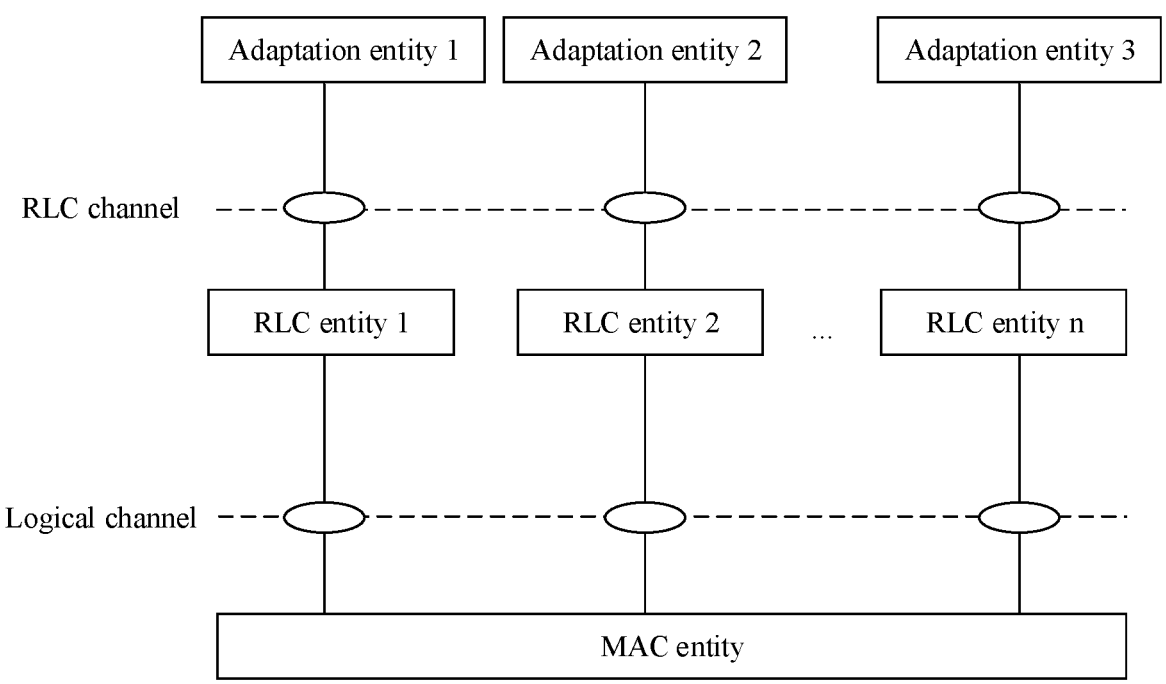

With reference to FIG. 1, FIG. 3(a) and FIG. 3(b) each are a schematic diagram of a correspondence between an RLC channel, a logical channel (LCH), and a protocol entity. As shown in FIG. 3(a) and FIG. 3(b), the radio link control (RLC) channel is a channel between an RLC entity and an upper-layer protocol entity of the RLC entity. For example, if an upper layer of the RLC entity is a PDCP entity, the RLC channel on a backhaul link is a channel between the RLC entity and the PDCP entity. For another example, if an upper layer of the RLC entity is a backhaul adaptation protocol (BAP) entity, the RLC channel on a backhaul link is a channel between the RLC entity and the BAP entity. Therefore, the RLC channel is specifically determined by the upper-layer protocol entity of the RLC entity.

The logical channel is a channel between the RLC entity and a lower-layer protocol entity of the RLC entity. For example, if a lower layer of the RLC entity is a MAC layer, the logical channel is a channel between the RLC entity and the MAC entity.

The RLC channel of the IAB node one-by-one corresponds to a RLC entity, and also one-by-one corresponds to a RLC bearer.

For a relationship between the BAP entity and the RLC entity, as shown in FIG. 3(a), one BAP entity may correspond to a plurality of RLC entities, or as shown in FIG. 3(b), one BAP entity may correspond to one RLC entity. This is not limited in this application.

In addition, a BAP layer has one or more of the following capabilities: adding, to a data packet, routing information that can be identified by a wireless backhaul node; performing routing selection based on the routing information that can be identified by the wireless backhaul node; adding, to the data packet, identification information that can be identified by the wireless backhaul node and that is related to a quality of service (QoS) requirement; performing QoS mapping on the data packet on a plurality of links including the wireless backhaul node; adding data packet type indication information to the data packet; and sending flow control feedback information to a node having a flow control capability. It should be noted that a name of a protocol layer having these capabilities is not necessarily the BAP layer, or may be another name. A person skilled in the art may understand that any protocol layer having these capabilities may be understood as the BAP layer in the embodiments of this application. An RLC channel on a BH link may be understood as a traffic differentiation channel on the BH link between two nodes, and the service differentiation channel may provide specific quality of service QoS guarantee for data packet transmission. The RLC channel on the BH link may be understood as a logical channel instead of a physical channel.

In this embodiment of this application, a BH RLC channel, that is, the RLC channel on the BH link, may be understood as the traffic differentiation channel on the BH link between the two nodes. The traffic differentiation channel may provide specific quality of service (QoS) guarantee for data packet transmission. The RLC channel on the BH link may be understood as a logical channel instead of a physical channel.

Specifically, the RLC channel on the BH link may be understood as peer RLC channels of two adjacent nodes that are connected on the BH link. For example, in FIG. 1, the IAB donor DU has an RLC channel 1 and an RLC channel 2, and the IAB node 1 has an RLC channel 1 and an RLC channel 2. The RLC channel 1 of the IAB donor DU is a peer of the RLC channel 1 of the IAB node 1, and the RLC channel 2 of the IAB donor DU is a peer of the RLC channel 2 of the IAB node 1. The RLC channel 1 on the BH link between the IAB donor DU and the IAB node 1 may be the RLC channel 1 of the IAB donor DU and the RLC channel 1 of the IAB node 1, and the RLC channel 2 on the BH link between the IAB donor DU and the IAB node 1 may be the RLC channel 2 of the IAB donor DU and the RLC channel 2 of the IAB node 1.

Because RLC channels, RLC bearers, and logical channels are in a one-to-one correspondence, in this embodiment of this application, the three descriptions may substitute for each other. For example, in this embodiment of this application, the RLC channel may be replaced with the RLC bearer or the logical channel. Similarly, the RLC channel on the BH link may be replaced with an RLC bearer on the BH link or a logical channel on the BH link. The RLC bearer on the BH link may also be referred to as a BH bearer or a BH link bearer.

It should be noted that an RLC channel used when a node receives a data packet may also be referred to as an ingress RLC channel, and an RLC channel used when a data packet is sent is referred to as an egress RLC channel.

With reference to the foregoing descriptions, in the IAB network, data payloads transmitted between the IAB node and the donor node may include an F1 traffic data payload and a non-F1 traffic data payload. The F1 traffic data payload includes an F1 user plane (F1-U) data payload or an F1 control plane (F1-C) data payload. The non-F1 traffic data payload may include data payloads other than the F1 user plane data payload and the F1 control plane data payload. These data payloads are collectively referred to as a first-type data payload in the embodiments of this application.

Currently, the non-F1 traffic data payload may be in a plurality of forms. For example, the non-F1 traffic data payload may include a control protocol data unit (PDU) at a BAP layer, an operation, administration, and maintenance (OAM) traffic data packet of the IAB node (which may be the IAB node DU in a specific implementation), a data packet sent when stream control transport protocol (SCTP) association is established between the IAB node (which may be the IAB node DU in a specific implementation) and the IAB donor or when SCTP association is maintained, and a data packet involved when an internet protocol security (IPsec) transmission channel is established between the IAB node (which may be the IAB node DU in a specific implementation) and the IAB donor. How to perform bearer mapping on the non-F1 traffic data payload on the wireless backhaul link is not involved in the conventional technology. An embodiment of this application provides a method, to perform bearer mapping on the non-F1 traffic data payload on the wireless backhaul link. Descriptions are provided below.

Embodiment 1

A control PDU at a BAP layer is transmitted between an IAB node and an IAB donor. The control PDU at the BAP layer may be considered as a non-F1 traffic data packet, and a data payload carried in the control PDU is a data payload other than an F1 user plane data payload and an F1 control plane data payload.

In this embodiment of this application, the control PDU at the BAP layer is exchanged between two adjacent nodes. For example, a child node sends the control PDU to a parent node, or a parent node sends the control PDU to a child node. The child node may be the IAB node, and the parent node may be another IAB node, or the parent node may be the IAB donor (which may be an IAB donor DU in a specific implementation). The control PDU at the BAP layer may include hop-by-hop control information, for example, include feedback information used for flow control, or include a notification that a wireless backhaul link is abnormal and that is sent by the parent node to the child node. The abnormality of the wireless backhaul link may be a radio link failure (RLF), blockage, or congestion of the wireless backhaul link, or may be a connection that is of the wireless backhaul link and that cannot be recovered, or the like. This control PDU at the BAP layer does not need to be encapsulated in an IP packet.

Figure 4:
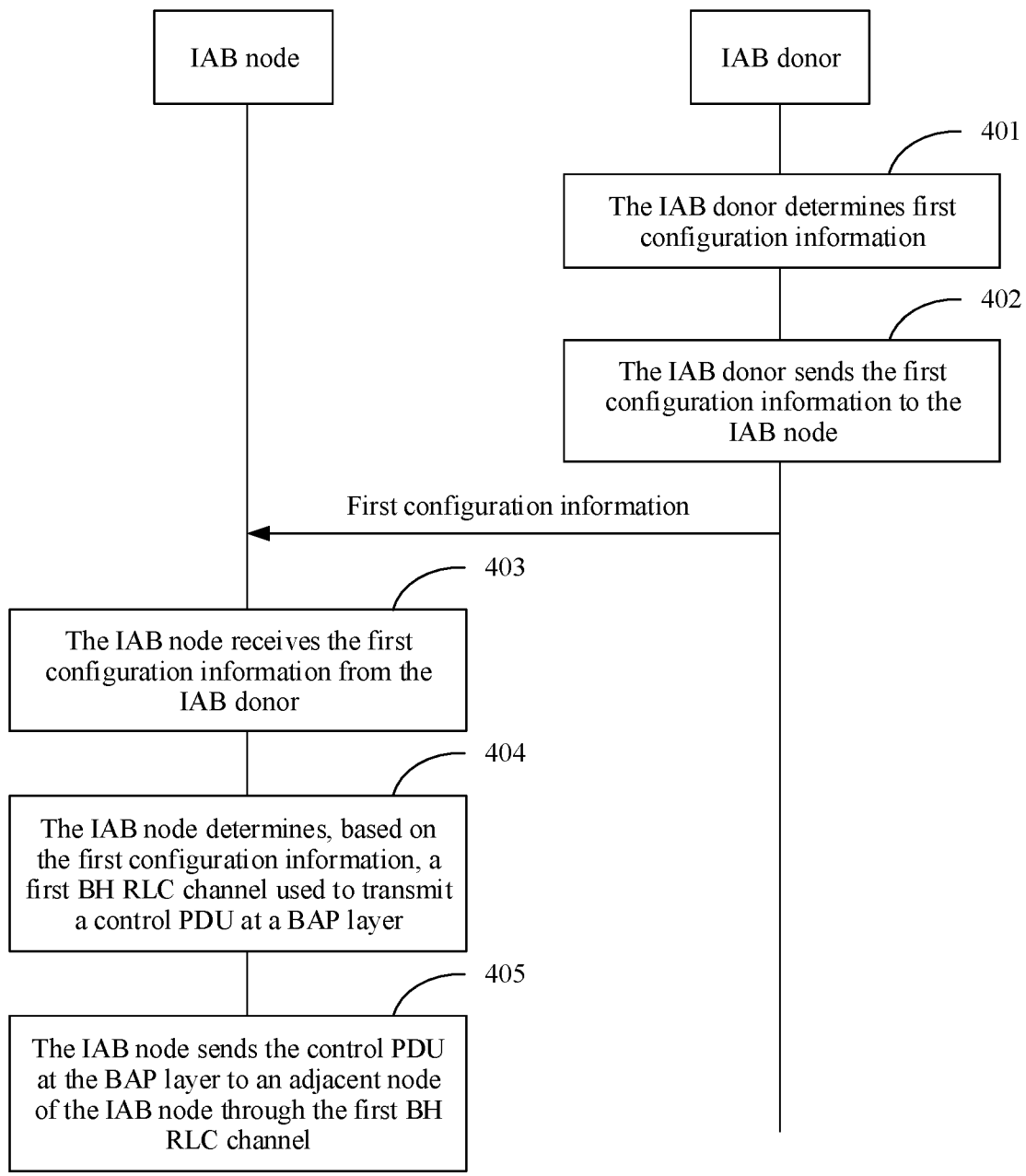
FIG. 4 is a schematic flowchart of a data packet transmission method according to an embodiment of this application.

With reference to the foregoing descriptions, FIG. 4 is a schematic flowchart of a data packet transmission method according to an embodiment of this application. Refer to FIG. 4. The method includes the following steps.

Step 401: An IAB donor determines first configuration information.

The first configuration information is used to indicate a first BH RLC channel, and the first BH RLC channel is used to transmit a control PDU at a BAP layer.

Step 402: The IAB donor sends the first configuration information to an IAB node.

In this embodiment of this application, the IAB donor may send the first configuration information by using a control plane message such as an F1AP message or an RRC message. Alternatively, the IAB donor (which may be an IAB donor DU or an IAB donor CU in a specific implementation) may receive the first configuration information from OAM of the IAB node, and then send the first configuration information to the IAB node.

It should be noted that if the IAB node has a parent node, the IAB donor may also send the first configuration information to the parent node of the IAB node. A specific process may be the same as a process of sending the first configuration information to the IAB node. Details are not described herein again.

For example, if the IAB donor includes a CU and a DU, steps 401 and 402 may be performed by the IAB donor CU. If the IAB donor includes the CU and the DU, the IAB donor CU may further configure the first configuration information for the IAB donor DU.

For example, if the IAB donor CU includes a CP and a UP, steps 401 and 402 may be performed by the IAB donor CU-CP.

Step 403: The IAB node receives the first configuration information from the IAB donor.

Step 404: The IAB node determines, based on the first configuration information, the first BH RLC channel used to transmit the control PDU at the BAP layer.

Step 405: The IAB node sends the control PDU at the BAP layer to an adjacent node of the IAB node through the first BH RLC channel.

The adjacent node of the IAB node may be, for example, a parent node (the parent node may be another IAB node or the IAB donor (which may be the IAB donor DU in a specific implementation in which the IAB donor is in an architecture in which the CU and the DU are separated)) of the IAB node, or a child node of the IAB node.

It should be noted that step 401 to step 403 and step 404 and step 405 may be two independent procedures. Step 401 to step 403 may be performed before step 404. After performing step 403, the IAB node may perform step 404 and step 405 based on an actual situation when determining to send the control PDU at the BAP layer.

According to the foregoing procedure, the IAB donor indicates, by using the first configuration information, the IAB node to send the control PDU at the BAP layer through the first BH RLC channel, to implement bearer mapping when the IAB node needs to send the control PDU at the BAP layer.

In this embodiment of this application, there may be a plurality of implementations of the first configuration information. In a possible implementation, the first configuration information may include a channel identifier of the first BH RLC channel. In this case, when sending the control PDU at the BAP layer, the IAB node may send the control PDU at the BAP layer through the first BH RLC channel corresponding to the channel identifier that is of the first BH RLC channel and that is in the first configuration information.

In another possible implementation, the first configuration information may include a logical channel identifier (LCID), and a logical channel indicated by the logical channel identifier corresponds to the first BH RLC channel. In this case, when sending the control PDU at the BAP layer, the IAB node determines the first BH RLC channel by using the logical channel identifier in the first configuration information, and sends the control PDU at the BAP layer through the first BH RLC channel.

For example, the IAB donor (which may be the IAB donor DU in a specific implementation) may also send the control PDU at the BAP layer to the IAB node. In this case, the IAB donor DU may also send the control PDU at the BAP layer based on the first BH RLC channel indicated by the first configuration information. For details, refer to descriptions of sending the control PDU at the BAP layer by the IAB node. Details are not described herein again.

In this embodiment of this application, in another possible implementation, the IAB donor may not send the first configuration information. In this case, the first BH RLC channel may be agreed on in advance, for example, a channel identifier of the first BH RLC channel or a first logical channel identifier is specified in a protocol. The first BH RLC channel corresponding to the specified channel identifier of the first BH RLC channel or the specified first logical channel identifier is used to send the control PDU at the BAP layer. In this case, the IAB node may determine the first BH RLC channel based on the channel identifier of the first BH RLC channel that is agreed on in advance or the first logical channel identifier, and send the control PDU at the BAP layer through the first BH RLC channel. Correspondingly, the IAB donor (which may be the IAB donor DU in a specific implementation) may also determine the first BH RLC channel based on the channel identifier of the first BH RLC channel that is agreed on in advance or the first logical channel identifier, and send the control PDU at the BAP layer through the first BH RLC channel.

In still another possible implementation, the IAB donor does not send the first configuration information. When a first node is to send the control PDU at the BAP layer to a second node, the first node determines, based on information carried in the control PDU at the BAP layer, a BH RLC channel used to transmit the control PDU at the BAP layer. The first node and the second node are directly connected through one backhaul link. For example, the first node is the IAB node, the second node is a parent node of the first node, the control PDU at the BAP layer that is generated by the first node carries buffer status information corresponding to the first BH RLC channel, and the first BH RLC channel is a BH RLC channel corresponding to a link between the first node and the second node. In this case, the first node sends the control PDU at the BAP layer to the second node through the first BH RLC channel. For another example, the first node is the IAB node, the second node is a parent node of the first node, and the control PDU at the BAP layer that is generated by the first node carries buffer status information corresponding to the first BH RLC channel and buffer status information corresponding to another BH RLC channel. However, the first BH RLC channel has a higher priority than another BH RLC channel, and the first BH RLC channel and the another BH RLC channel each are a BH RLC channel corresponding to a link between the first node and the second node. In this case, the first node sends the control PDU at the BAP layer to the second node through the first BH RLC channel.

The foregoing describes how to transmit the control PDU at the BAP layer. The following describes how to transmit another non-F1 traffic data payload.

Embodiment 2

Figure 5:
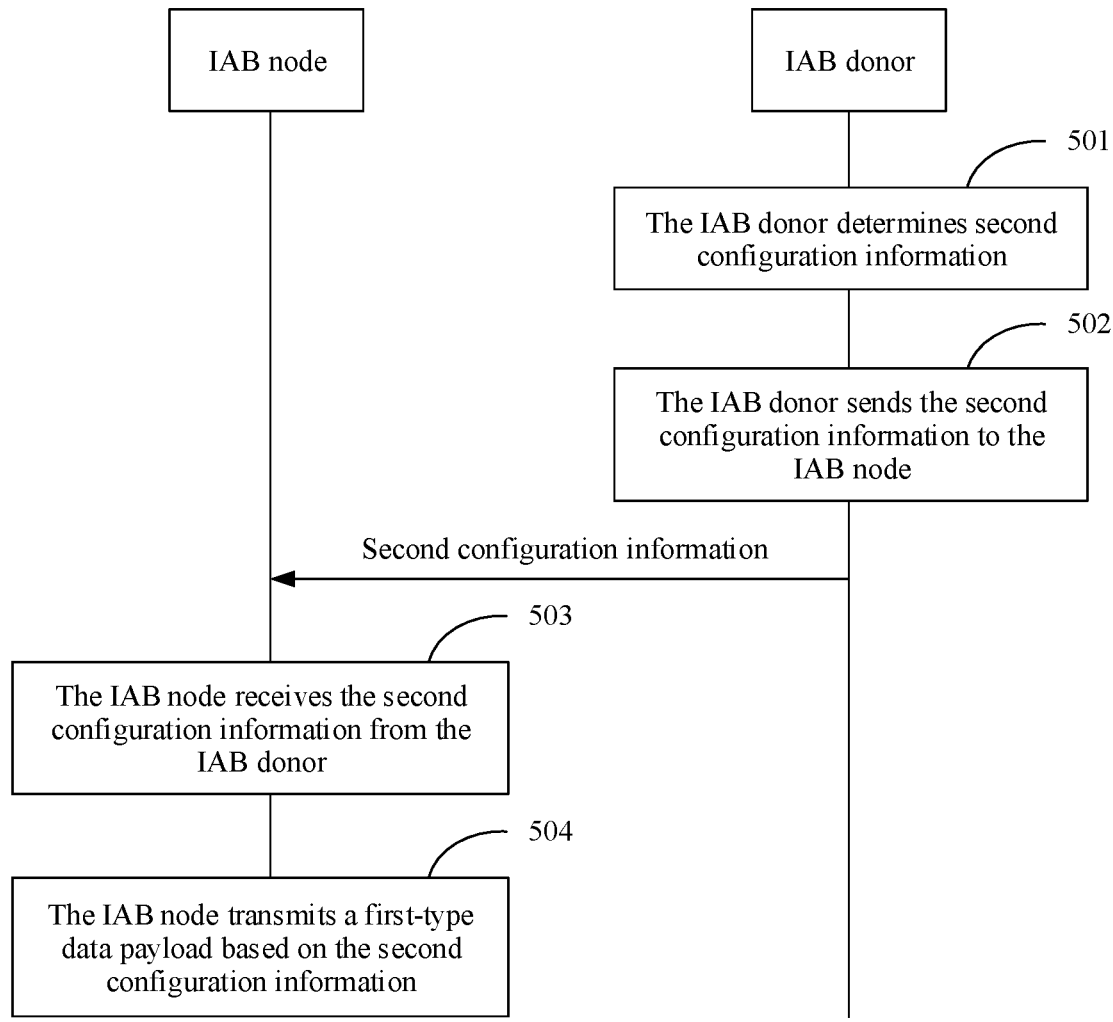
FIG. 5 is a schematic flowchart of a data packet transmission method according to an embodiment of this application.

FIG. 5 is a schematic flowchart of a data packet transmission method according to an embodiment of this application. Refer to FIG. 5. The method includes the following steps.

Step 501: An IAB donor determines second configuration information.

The second configuration information is used to indicate a second BH RLC channel, the second BH RLC channel is used to transmit a first-type data payload, and the first-type data payload is a data payload other than an F1 user plane F1-U data payload and an F1 control plane F1-C data payload.

Step 502: The IAB donor sends the second configuration information to an IAB node.

In this embodiment of this application, the IAB donor may send the second configuration information by using a control plane message such as an F1AP message or an RRC message. Alternatively, the IAB donor may receive the second configuration information from OAM of the IAB node, and then send the second configuration information to the IAB node.

Optionally, if the IAB node has a parent node, the IAB donor may also send the second configuration information to the parent node of the IAB node. A specific process may be the same as a process of sending the second configuration information to the IAB node. Details are not described herein again.

For example, if the IAB donor includes a CU and a DU, steps 501 and 502 may be performed by the IAB donor CU. If the IAB donor includes the CU and the DU, the IAB donor CU may further configure the second configuration information for the IAB donor DU. Alternatively, the IAB donor DU may obtain the second configuration information by using the OAM.

For example, if the IAB donor CU includes a CP and a UP, steps 501 and 502 may be performed by the IAB donor CU-CP.

Step 503: The IAB node receives the second configuration information from the IAB donor.

Step 504: The IAB node transmits the first-type data payload based on the second configuration information.

According to the foregoing procedure, the IAB donor indicates, by using the second configuration information, the IAB node to send, through the second BH RLC channel, the data payload other than the F1 user plane F1-U data payload and the F1 control plane F1-C data payload, to perform bearer mapping on a non-F1 traffic data payload.

In this embodiment of this application, the second configuration information includes identification information used to identify the second BH RLC channel, and the identification information may be a channel identifier of the second BH RLC channel or a logical channel identifier corresponding to the second BH RLC channel. The second configuration information may further include any one or more of the following:

a first type, where the first type is a type of a data payload, and the first type corresponds to the second BH RLC channel;

first differentiated service information, where the first differentiated service information corresponds to the first type and/or the second BH RLC channel; and a first flow label, where the first flow label corresponds to the first type and/or the second BH RLC channel.

It should be noted that the differentiated service information may be a differentiated services code point (DSCP), a type of service (ToS) in an internet protocol version 4 (IPv4) packet header, a traffic class field in an internet protocol version 6 (IPv6) packet header, the first six bits of a traffic class field in an IPv6 packet header, or the like. The flow label also refers to a flow label field carried in the IPv6 packet header.

In this implementation, the first-type data payload includes any one or more of the following:

OAM traffic packet of the IAB node;

a packet used to request an IP address, for example, a dynamic host configuration protocol (DHCP) packet such as a DHCP discover packet or a DHCP offer packet, a dynamic host configuration protocol for IPv6 (DHCPv6) packet such as a DHCPv6 solicit packet or a DHCPv6 advertise packet, an IPv6-based router solicitation packet, or an IPv6-based router advertisement packet;

a packet used to establish an IPsec transmission channel; and an SCTP association maintenance packet. The SCTP association maintenance packet is an SCTP layer message that does not include a data chunk, and the data chunk refers to a data packet at an upper-layer protocol layer of an SCTP layer. For example, the SCTP association maintenance packet includes but is not limited to packets such as an SCTP association setup data packet, an SCTP association shutdown data packet, and an SCTP association heartbeat data packet.

In this implementation, in a downlink direction, when the IAB donor sends a first data payload to the IAB node, the first data payload is the first-type data payload. In this case, the IAB donor (which may be the IAB donor DU, the IAB donor CU, the IAB donor CU-CP, or the IAB donor CU-UP in a specific implementation) may use packet header information corresponding to the first data payload to carry the first differentiated service information or the first flow label. The packet header information may be an IP packet header.

The IAB donor (which may be the IAB donor DU in a specific implementation) may send a first data packet to the IAB node through the second BH RLC channel corresponding to the first differentiated service information, send a first data packet to the IAB node through the second BH RLC channel corresponding to the first flow label, or send a first data packet to the IAB node through the second BH RLC channel corresponding to the first type, where the first data packet includes the first data payload.

Figure 6:
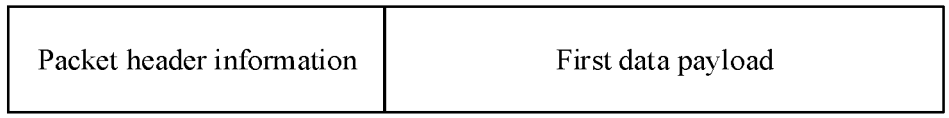
FIG. 6 is a schematic diagram of a structure of a data packet according to an embodiment of this application.

For example, with reference to the foregoing descriptions, as shown in FIG. 6, the first data packet includes the first data payload and the packet header information, and the first data packet may further include other information. Details are not described herein. As described above, the first data payload may be the OAM traffic packet, the packet used to request the IP address, or the like. The packet header information may be the IP packet header. After obtaining the first data payload, the IAB donor adds the corresponding packet header information to the first data payload, to obtain the first data packet.

In this implementation, in an uplink direction, when the IAB node sends the first data payload, the first data payload is the first-type data payload. In this case, the IAB node may use the packet header information corresponding to the first data payload to carry the first differentiated service information or the first flow label. The IAB node may send the first data packet to a next-hop node of the IAB node through the second BH RLC channel corresponding to the first differentiated service information, or send the first data packet to a next-hop node of the IAB node through the second BH RLC channel corresponding to the first flow label, where the first data packet includes the first data payload and the packet header information corresponding to the first data payload. Alternatively, in an uplink direction, when the IAB node sends the first data payload, the first data payload is the first-type data payload. In this case, the IAB node may send the first data packet to a next-hop node of the IAB node through the second BH RLC channel corresponding to the first type, where the first data packet includes the first data payload. The next-hop node of the IAB node is a parent node of the IAB node, and may be specifically the IAB donor (for example, the IAB donor DU) or another IAB node.

In this embodiment of this application, in another possible implementation, the IAB donor may not send the second configuration information. In this case, in a possible implementation, the second BH RLC channel may be agreed on in advance, for example, a channel identifier of the second BH RLC channel or a second logical channel identifier is specified in a protocol. The second BH RLC channel corresponding to the specified channel identifier of the second BH RLC channel or the specified second logical channel identifier is used to send the first-type data payload. In this case, the IAB node may determine the second BH RLC channel based on the channel identifier of the second BH RLC channel that is agreed on in advance or the second logical channel identifier, and send a data packet whose data payload type is the first type through the second BH RLC channel. Correspondingly, the IAB donor (which may be, for example, the IAB donor DU in a specific implementation) may also determine the second BH RLC channel based on the channel identifier of the second BH RLC channel that is agreed on in advance or the second logical channel identifier, and send a data packet whose data payload type is the first type through the second BH RLC channel. For example, a channel identifier of a default second BH RLC channel is specified in a protocol, and a BH RLC channel specified by the channel identifier is a default BH RLC channel, and may be used to transmit the first-type data payload.

In another possible implementation, in addition to the channel identifier of the second BH RLC channel or the second logical channel identifier, one or more of the following may be preset (for example, specified in a protocol): a first type, first differentiated service information, a correspondence between the first type and the first differentiated service information, a correspondence between the first differentiated service information and the second BH RLC channel, a first flow label, a correspondence between the first type and the first flow label, and a correspondence between the first flow label and the second BH RLC channel.

In this implementation, for uplink transmission, when the IAB node determines to send the first-type data payload, the IAB node uses packet header information corresponding to the first-type data payload to carry preset first differentiated service information or a preset first flow label, and sends the first-type data payload through the second BH RLC channel corresponding to the preset first differentiated service information or the preset first flow label. Alternatively, when determining to send the first-type data payload, the IAB node sends the first-type data payload through the second BH RLC channel corresponding to the first type. For downlink transmission, when the IAB donor determines to send the first-type data payload, the IAB donor (which may be the IAB donor CU, the IAB donor CU-UP, or the IAB donor CU-CP in a specific implementation) uses packet header information corresponding to the first-type data payload to carry preset first differentiated service information or a preset first flow label, and the IAB donor (which may be the IAB donor DU in a specific implementation) sends the first-type data payload through the second BH RLC channel corresponding to the preset first differentiated service information or the preset first flow label. Alternatively, when determining to send the first-type data payload, the IAB donor sends the first-type data payload through the second BH RLC channel corresponding to the first type.

In another possible implementation, IP 5-tuple information, a correspondence between the IP 5-tuple information and the first differentiated service information, and a correspondence between the first differentiated service information and the second BH RLC channel may be preset, or IP 5-tuple information, a correspondence between the IP 5-tuple information and the first flow label, and a correspondence between the first flow label and the second BH RLC channel may be preset. The IP 5-tuple information includes at least one of the following: a source IP address, a destination IP address, a source port number, a destination port number, and a transport layer protocol type.

In this implementation, for uplink transmission, when determining that IP 5-tuple information corresponding to the sent data payload is the preset IP 5-tuple information, the IAB node uses packet header information corresponding to the data payload to carry preset first differentiated service information or a preset first flow label, and sends the data payload through the second BH RLC channel corresponding to the preset first differentiated service information or the preset first flow label. For downlink transmission, the IAB donor also sends the data payload in a same manner. Details are not described herein again.

The foregoing describes how to transmit the non-F1 traffic data payloads such as the control PDU at the BAP layer and the packet used to establish SCTP association. The following further describes how to transmit an F1 traffic data payload. It should be noted that, data payloads in Embodiment 3 to Embodiment 6 each are an F1 user plane (F1-U) data payload or an F1 control plane (F1-C) data payload unless otherwise specified.

In the IAB network shown in FIG. 1, the IAB node 1 is an IAB node that provides an access service for the terminal side device, and the IAB node 2 is an intermediate IAB node. It should be noted that, an IAB node may be used as both an intermediate IAB node and an access IAB node. For example, the IAB node 2 may be used as an intermediate node between the IAB node 1 and the IAB donor, but for the terminal side device that accesses a cell served by the IAB node 1, the IAB node 2 is used as an access IAB node.

On a wireless backhaul link between the IAB node 2 and the IAB node 1 and a wireless backhaul link between the IAB node 2 and the IAB donor (which may be the IAB donor DU in a specific implementation), one or more backhaul link (BH) RLC channels are established based on configuration of the IAB donor. When sending a data packet through a backhaul link, the IAB node or the IAB donor (which may be the IAB donor DU in a specific implementation) needs to perform bearer mapping. For example, bearer mapping needs to be first performed by the IAB donor (may be performed by the IAB donor DU in a specific implementation) on a data packet that is transmitted on a downlink. To be specific, a proper BH RLC channel is selected from the BH RLC channels on the link between the IAB node 2 and the IAB donor for sending the data packet. When receiving, from the IAB donor, a data packet that needs to be sent to the IAB node 1, the IAB node 2 also needs to select a proper BH RLC channel from the BH RLC channels on the link between the IAB node 1 and the IAB node 2 for sending the data packet.

Similarly, for a data packet that is transmitted on an uplink, for example, bearer mapping also needs to be performed by the IAB node 1 on an uplink data packet sent by the IAB node 1. To be specific, a BH RLC channel is selected from the BH RLC channels on the link between the IAB node 1 and the IAB node 2 for sending the data packet to the IAB node 2.

In the conventional technology, when the IAB node 2 used as the intermediate IAB node performs bearer mapping, the IAB node 2 relies on an ingress BH RLC channel used to receive a data packet. Specifically, an egress BH RLC channel corresponding to an ingress BH RLC channel of a data packet may be used as an egress BH RLC channel used to send the data packet. However, this implementation is not flexible enough. When data packets received from a same ingress BH RLC channel are sent to a next-hop node, the data packets can only be mapped to a same egress BH RLC channel for transmission. Consequently, flexibility is poor, differentiated quality of service (QoS) guarantee cannot be provided for data packets of different traffic, and QoS requirements of the data packets cannot be met.

In this embodiment of this application, a data packet transmitted on a wireless backhaul link may be allowed to carry additional information used by the intermediate IAB node to perform bearer mapping, so that the intermediate IAB node can perform bearer mapping more flexibly. The additional information may be a label, and the label may be carried in a backhaul adaptation protocol BAP layer header information of the data packet. It should be noted that the label may further have another name. In this embodiment of this application, the label is merely used as an example for description. When a communications standard changes, the corresponding name may also be replaced with a name of a corresponding function in a changed communications standard.

The following describes how to add and use a label to perform bearer mapping on a wireless backhaul link respectively from perspectives of an IAB donor, an intermediate IAB node, and an access IAB node.

Embodiment 3

Figure 7:
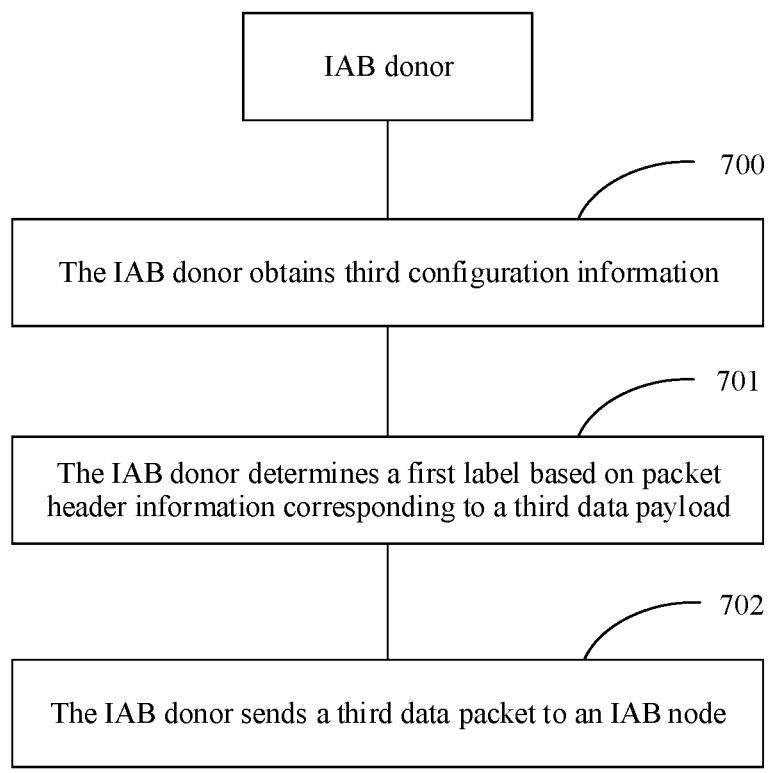
FIG. 7 is a schematic flowchart of a data packet transmission method according to an embodiment of this application.

FIG. 7 is a schematic flowchart of a data packet transmission method according to an embodiment of this application. The method includes the following step:

Step 700: An IAB donor obtains third configuration information.

The third configuration information is used to configure a correspondence between a first label and first information in packet header information corresponding to a third data payload obtained by the IAB donor. The first information may include any one or more of the following: first differentiated service information, a first flow label, and a first IP address.

For example, in this embodiment of this application, the third configuration information may include any one of the following:

(1) the first differentiated service information and a first label corresponding to the first differentiated service information, where in this embodiment of this application, the differentiated service information may be a DSCP, or when the packet header information corresponding to the third data payload is an IPv4 packet header, the differentiated service information may be a type of service (ToS) in the IPv4 packet header, or when the packet header information corresponding to the third data payload is an IPv6 packet header, the differentiated service information may be a class type field in the IPv6 packet header, the first six bits of a class type field in the IPv6 packet header, or the like;

(2) the first flow label and a first label corresponding to the first flow label, where when the packet header information corresponding to the third data payload is an IPv6 packet header, the flow label is also information carried in the IPv6 packet header;

(3) the first differentiated service information, the first flow label, and corresponding first labels;

(4) the first IP address and a first label corresponding to the first IP address;

(5) the first flow label, the first IP address, and corresponding first labels;

(6) the first differentiated service information, the first IP address, and corresponding first labels; and (7) the first differentiated service information, the first flow label, the first IP address, and corresponding first labels.

It should be noted that the first IP address in the third configuration information may be a destination IP address in a data packet. For (4) in the third configuration information, the first IP address may alternatively be a source IP address in a data packet.

Based on the third configuration information, after obtaining the third data payload, the IAB donor may determine the first label based on one or more of differentiated service information, a flow label, and an IP address in the packet header information corresponding to the third data payload, and then send the first label and the third data payload to a next-hop node. For details, refer to descriptions of step 701 and step 702.

Optionally, this embodiment of this application further includes the following steps.

Step 701: The IAB donor determines the first label based on the packet header information corresponding to the third data payload.

Specifically, the IAB donor determines the first label based on the packet header information corresponding to the third data payload and the third configuration information.

The first label is used to determine an egress RLC channel of the third data payload.

Figure 8:
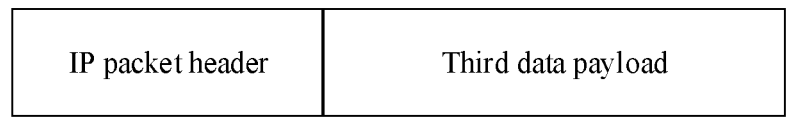
FIG. 8 is a schematic diagram of a structure of a data packet according to an embodiment of this application.

It should be noted that the IAB donor may receive a downlink data packet including the third data payload, where a structure of the downlink data packet may be shown in FIG. 8. The downlink data packet shown in FIG. 8 includes the third data payload and the packet header information, and the packet header information may be an IP packet header.

Step 702: The IAB donor sends a third data packet to the IAB node.

The third data packet includes the third data payload and a first BAP layer header, and the first BAP layer header includes the first label.

It should be noted that, after the IAB node receives the third data packet, for details about how to determine the egress RLC channel of the third data payload based on the first label, reference may be made to the following descriptions.

Figure 9:
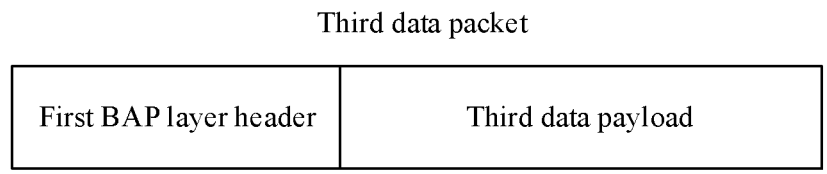
FIG. 9 is a schematic diagram of a structure of a data packet according to an embodiment of this application.

With reference to FIG. 8, after receiving the downlink data packet shown in FIG. 8, the IAB donor may add the first BAP layer header to the downlink data packet, to obtain the third data packet. A structure of the third data packet may be shown in FIG. 9. The third data packet includes the first BAP layer header, the third data payload, and the like.

For example, if the IAB donor includes a CU and a DU, the IAB donor in step 700 to step 702 may be specifically the IAB donor DU, that is, the IAB donor DU may add the first label to the first BAP layer header in the third data packet. Correspondingly, the IAB donor CU (which may be an IAB donor CU-CP in a specific implementation) sends the third configuration information to the IAB donor DU.

For example, the third configuration information may be included in an F1AP message sent by the IAB donor CU to the IAB donor DU.

For example, if the IAB donor is not in a form in which the CU and the DU are separated, the IAB donor does not need to obtain the third configuration information, and the IAB donor may generate the third configuration information, or may obtain the third configuration information from OAM.

Embodiment 4

Figure 10:
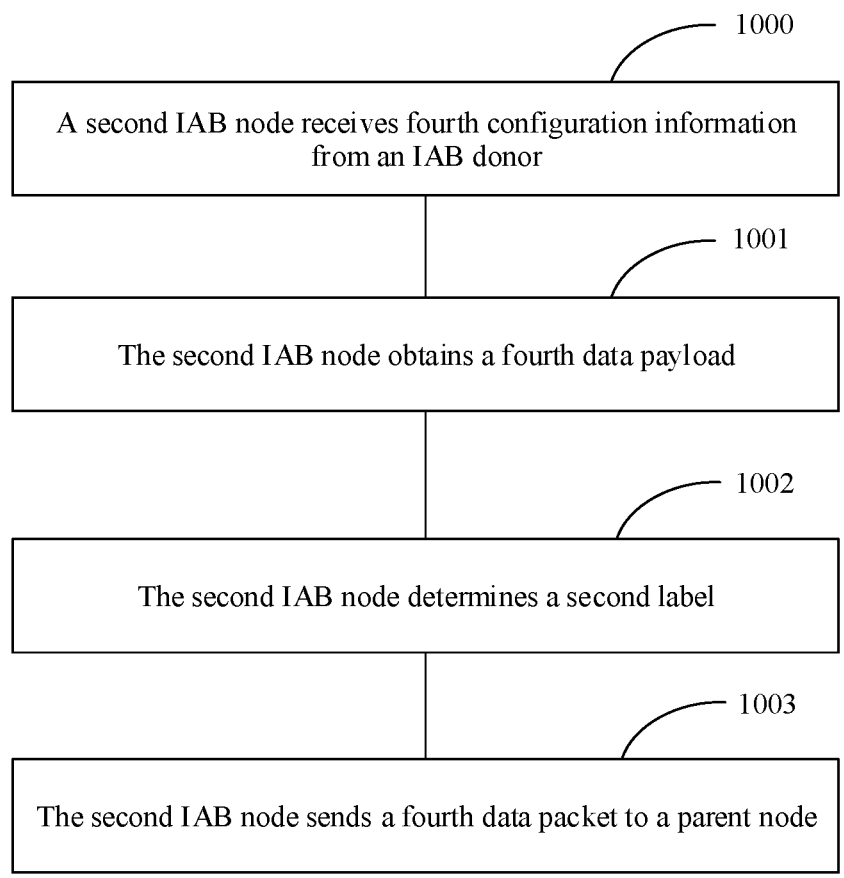
FIG. 10 is a schematic flowchart of a data packet transmission method according to an embodiment of this application.

FIG. 10 is a schematic flowchart of a data packet transmission method according to an embodiment of this application. The method includes the following step:

Step 1000: A second IAB node receives fourth configuration information from an IAB donor.

The second IAB node may be an access IAB node.

For example, if the IAB donor includes a CU and a DU, the IAB donor CU may configure the fourth configuration information for the second IAB node.

For example, if the IAB donor CU includes a CP and a UP, the IAB donor CU-CP may configure the fourth configuration information for the second IAB node.

In a possible implementation, the fourth configuration information is used to configure a correspondence between a second label and second information in packet header information corresponding to a fourth data payload obtained by the second IAB node, and the second label is used to determine an egress RLC channel of the fourth data payload. The second information may include any one or more of the following:

second differentiated service information in the packet header information, a second flow label in the packet header information, a second IP address in the packet header information, and data radio bearer information that is in the packet header information and that corresponds to the fourth data payload.

For example, the fourth configuration information may include any one or more of the following:

(1) the second flow label and a second label corresponding to the second flow label;
(2) the second flow label, the second IP address, and second labels corresponding to the second flow label and the second IP address;
(3) the second IP address and a second label corresponding to the second IP address;
(4) the second differentiated service information and a second label corresponding to the second differentiated service information;
(5) the second differentiated service information, the second IP address, and second labels corresponding to the second differentiated service information and the second IP address;
(6) the second differentiated service information, the second flow label, and second labels corresponding to the second differentiated service information and the second flow label; and
(7) the second differentiated service information, the second flow label, the second IP address, and corresponding second labels.

It should be noted that the second IP address in the fourth configuration information may be a destination IP address. For the differentiated service information and the flow label in the fourth configuration information, refer to descriptions of the third configuration information. Details are not described herein again.

In another possible implementation, the fourth configuration information is used to configure a correspondence between the fourth data payload and the second label. For example, the fourth configuration information may include any one or more of the following:

(8) The data radio bearer information corresponding to the fourth data payload and a second label corresponding to the data radio bearer information.

In this case, the fourth data payload is a user plane data packet.

The data radio bearer information may be any one of the following content: a general packet radio service (GPRS) tunneling protocol user plane (GTP-U) tunnel endpoint identifier (TEID) carried in the user plane data packet, a GTP TEID and an IP address that are carried in the user plane data packet, a UE DRB identifier (which may be jointly determined based on an identifier of UE and a DRB ID) of the user plane data packet, and a logical channel identifier of the user plane data packet. The GTP TEID is a tunnel endpoint identifier carried in header information of a GTP user plane protocol layer, and the tunnel endpoint identifier may be an uplink tunnel endpoint identifier allocated by the IAB donor or the IAB donor CU, and corresponds to one UE data radio bearer (DRB).

(9) A second type of the fourth data payload and a second label corresponding to the second type.

In this case, the fourth data payload is an F1 control plane packet, that is, an F1AP message. The second type is any one or more of F1AP message types.

In a possible implementation, there may be the following two F1AP message types: a UE associated F1AP message and a non-UE associated F1AP message. Alternatively, in another possible implementation, there may be the following plurality of specific F1AP message types: an F1 setup request, a gNB-DU configuration update, a UE context setup response, and the like. Specifically, message types that are sent by the IAB donor DU to the IAB donor CU in a plurality of F1AP messages described in Section 9.2/8.1 in TS 38.874 may be included. Alternatively, in another possible implementation, there may be the following F1AP message type: a UE signaling radio bearer (SRB) type corresponding to content (for example, an RRC message of the UE) included in the F1AP message.

The foregoing descriptions are merely examples. There may be another case of the F1AP message type. Details are not described herein again.

(10) A stream identifier at an SCTP layer that carries the F1AP message when the fourth data payload is the F1AP message, and a second label corresponding to the stream identifier.

Based on the fourth configuration information, after the second IAB node obtains an uplink data packet including the fourth data payload, the second IAB node determines the second label based on the second information in the uplink data packet, the data radio bearer information corresponding to the fourth data payload, the F1AP message type corresponding to the fourth data payload, or the stream identifier at the SCTP layer that carries the fourth data payload, and then sends, to a next-hop node, the uplink data packet to which the second label is added. For details, refer to descriptions of step 1001 to step 1003.

Optionally, this embodiment of this application further includes the following steps.

Step 1001: The second IAB node obtains the fourth data payload. Specifically, the second IAB node may generate the fourth data payload, or receive the fourth data payload from a terminal device or a child node served by the second IAB node.

Step 1002: The second IAB node determines the second label.

Specifically, the second IAB node may determine the second label based on the packet header information corresponding to the fourth data payload, the data radio bearer information corresponding to the fourth data payload, the F1AP message type corresponding to the fourth data payload, or the stream identifier at the SCTP layer that carries the fourth data payload.

Step 1003: The second IAB node sends a fourth data packet to a parent node.

The fourth data packet includes the fourth data payload and a second BAP layer header, and the second BAP layer header includes the second label.

Embodiment 5

Figure 11:
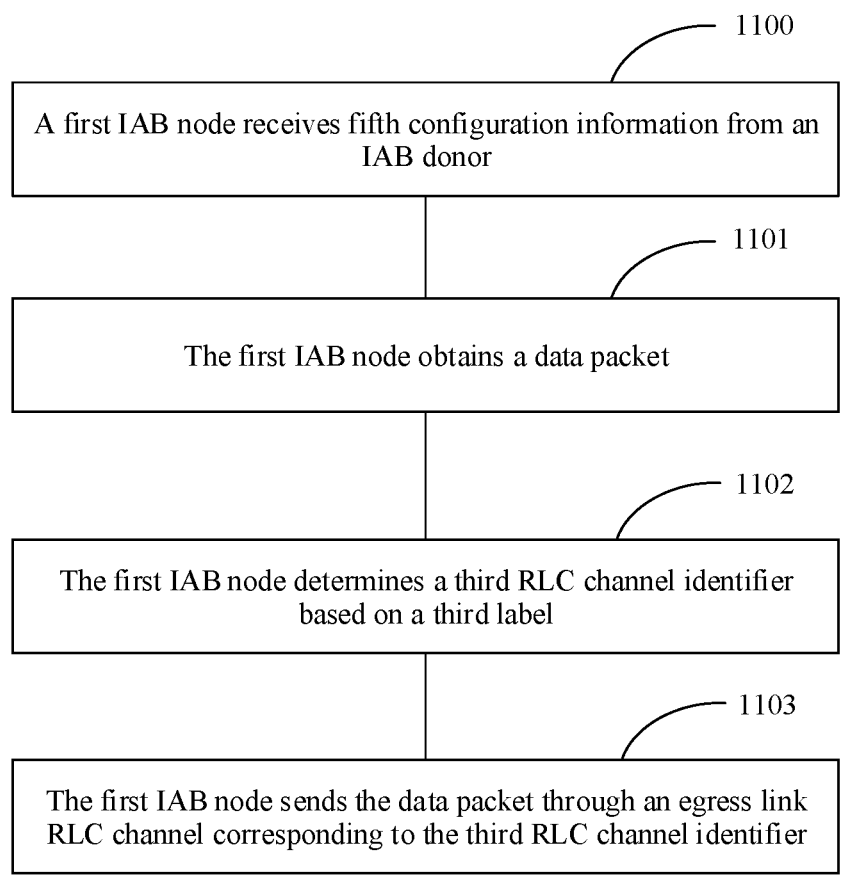
FIG. 11 is a schematic flowchart of a data packet transmission method according to an embodiment of this application.

FIG. 11 is a schematic flowchart of a data packet transmission method according to an embodiment of this application. The method includes the following step:

Step 1100: A first IAB node receives fifth configuration information from an IAB donor.

The fifth configuration information is used to configure a correspondence between a third label and a third RLC channel identifier. The third label is carried in a BAP layer header of a data packet, and is used by the first IAB node to determine an egress RLC channel of the data packet. The third RLC channel identifier is used to identify an egress BH RLC channel (that is, a third BH RLC channel) through which the first IAB node sends a data packet, and may be an identifier of the third BH RLC channel or a logical channel identifier corresponding to the third BH RLC channel.

For example, the fifth configuration information may include any one or more of the following:

(1) The third label and a corresponding third RLC channel identifier.

(2) The third label, an egress link identifier, and corresponding third RLC channel identifiers, where the egress link identifier is used to indicate an egress link on which the first IAB node sends a data packet. Specifically, for uplink transmission, the egress link identifier may be an identifier of a parent node of the first IAB node (for example, a BAP layer identifier of the parent node, a DU identifier of the parent node, an IP address of the parent node, a cell identifier of the parent node, or a cell group identifier of the parent node for the first IAB node). For downlink transmission, the egress link identifier may be an identifier of a child node of the first IAB node (for example, an F1 control plane identifier DU F1AP UE ID allocated by the first IAB node to the child node, a cell identifier of the first IAB node accessed by the child node+a cell radio network temporary identifier C-RNTI allocated by the first IAB node to the child node, an IP address of the child node, or a BAP layer identifier of the child node).

(3) The third label, a fourth RLC channel identifier, and corresponding third RLC channel identifiers, where the fourth RLC channel identifier is used to identify an ingress BH RLC channel (that is, a fourth BH RLC channel) through which the first IAB node receives a data packet, and may be an identifier of the fourth BH RLC channel or a logical channel identifier corresponding to the fourth BH RLC channel.

(4) The third label, an ingress link identifier, the fourth RLC channel identifier, the egress link identifier, and corresponding third RLC channel identifiers, where for the fourth RLC channel identifier, refer to descriptions of (3), and for the egress link identifier, refer to descriptions of (2). Details are not described herein again. The ingress link identifier is used to indicate an ingress link on which the first IAB node receives a data packet. Specifically, for uplink transmission, the ingress link identifier may be an identifier of a child node of the first IAB node. For a specific example of the identifier of the child node, refer to descriptions of (2). For downlink transmission, the ingress link identifier may be an identifier of a parent node of the first IAB node. For a specific example of the identifier of the parent node, refer to descriptions of (2). Details are not described herein again.

(5) A correspondence between the third label and a QoS identifier. Optionally, a correspondence between the QoS identifier and a third RLC channel identifier is further included. In this correspondence, the third label does not directly have a correspondence with the egress RLC channel, and there is an intermediate mapping process, that is, there is a correspondence between the third label and the QoS identifier, and there is a correspondence between the QoS identifier and the egress RLC channel. Both the correspondence between the third label and the QoS identifier and the correspondence between the QoS identifier and the third RLC channel identifier may be configured (for example, the fifth configuration information includes the third label, the QoS identifier corresponding to the third label, and the third RLC channel identifier), or the correspondence between the third label and the QoS identifier and the correspondence between the QoS identifier and the third RLC channel identifier may be separately configured (for example, the fifth configuration information includes the third label and the QoS identifier, to configure the correspondence between the third label and the QoS identifier, and other configuration information includes the third RLC channel identifier and the QoS identifier, to configure the correspondence between the QoS identifier and the third RLC channel identifier). This is not limited in this embodiment of this application.

It should be noted that one QoS identifier may be used to represent one or a group of QoS parameters. The QoS identifier may be specifically a QoS class identifier (QCI), a 5G QoS indicator (5QI), a QoS flow identifier (QFI), or the like. One or a group of QoS parameters, for example, includes a latency, a packet loss rate, and bandwidth and so on).

(6) A correspondence between the third label and the QoS parameter and a correspondence between the QoS parameter and the third RLC channel identifier. Both the correspondence between the third label and the QoS parameter and the correspondence between the QoS parameter and the third RLC channel identifier may be configured (for example, the fifth configuration information includes the third label, the QoS parameter corresponding to the third label, and the third RLC channel identifier), or the correspondence between the third label and the QoS parameter and the correspondence between the QoS parameter and the third RLC channel identifier may be separately configured (for example, the fifth configuration information includes the third label and the QoS parameter, to configure the correspondence between the third label and the QoS parameter, and other configuration information includes the third RLC channel identifier and the QoS parameter, to configure the correspondence between the QoS parameter and the third RLC channel identifier). This is not limited in this embodiment of this application.

It should be noted that the third label may be used as an optional field. If the data packet does not carry the third label, configuration information configured by the IAB donor for the IAB node may include only a correspondence between an ingress RLC channel and an egress RLC channel, that is, a correspondence between the fourth RLC channel identifier and the third RLC channel identifier.

For example, if the IAB donor includes a CU and a DU, the IAB donor CU may configure the fifth configuration information for the first IAB node.

For example, if the IAB donor CU includes a CP and a UP, the IAB donor CU-CP may configure the fifth configuration information for the first IAB node.

In this embodiment, the first IAB node may be an intermediate IAB node. A data packet (the data packet may be an uplink data packet or a downlink data packet) received by the intermediate IAB node on a wireless backhaul link has carried a label. Therefore, the intermediate IAB node needs to perform bearer mapping based on the label carried in the data packet, that is, selects an egress RLC channel for the data packet to send the data packet to a next-hop node. In this embodiment of this application, the intermediate IAB node may perform bearer mapping on the received data packet based on the fifth configuration information. Descriptions are provided below in detail.

Optionally, this embodiment of this application further includes the following steps.

Step 1101: The first IAB node obtains a data packet.

The data packet is a data packet from a second IAB node, or the data packet is a data packet from an IAB donor.

A backhaul adaptation protocol BAP layer header of the data packet includes the third label.

Step 1102: The first IAB node determines the third RLC channel identifier based on the third label.

For example, when the fifth configuration information includes the third label, the ingress link identifier, the fourth RLC channel identifier, the egress link identifier, and the third RLC channel identifier, the first IAB node performs routing selection on the data packet to determine the egress link identifier, and then determines the third RLC channel identifier based on the third label in the data packet, an ingress link on which the data packet is received, and a fourth RLC channel on the ingress link on which the data packet is received. Another case is not described.

Step 1103: The first IAB node sends the data packet through the egress RLC channel corresponding to the third RLC channel identifier.

In the foregoing process, the first IAB node performs bearer mapping on the data packet based on the fifth configuration information. This solution may allow the first IAB node to perform bearer mapping more flexibly, to provide finer QoS guarantee in the IAB network.

Embodiment 6

Figure 12:
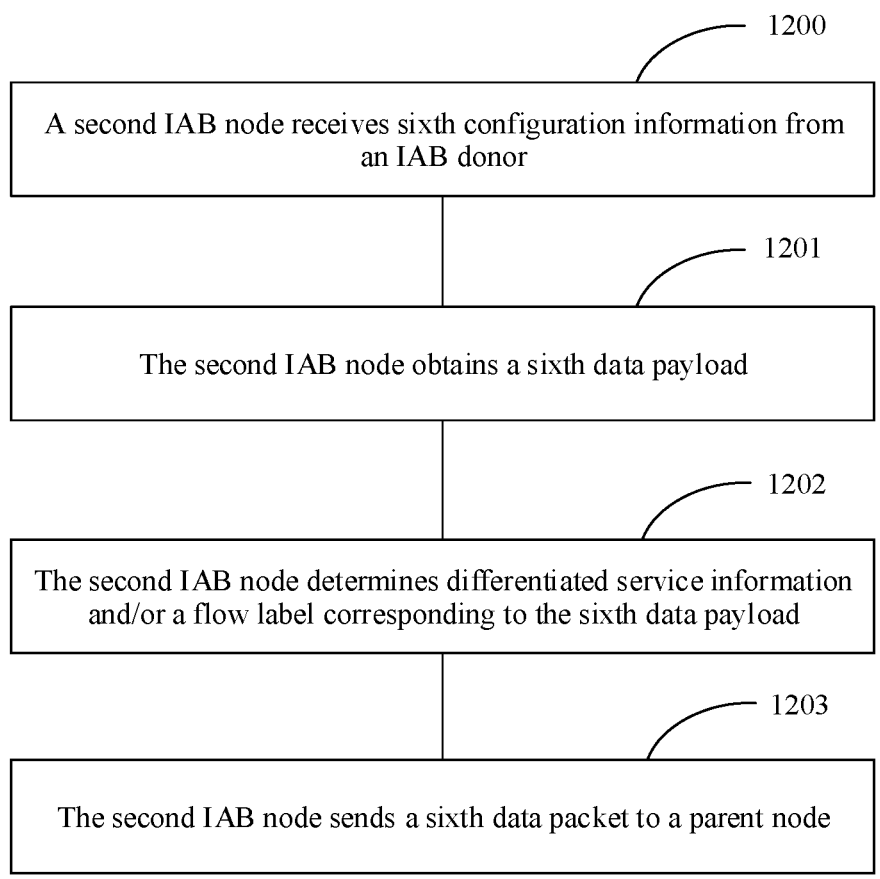
FIG. 12 is a schematic flowchart of a data packet transmission method according to an embodiment of this application.

FIG. 12 is a schematic flowchart of a data packet transmission method according to an embodiment of this application. The method includes the following step:

Step 1200: A second IAB node receives sixth configuration information from an IAB donor.

The second IAB node may be an access IAB node.

For example, if the IAB donor includes a CU and a DU, the IAB donor CU may configure the sixth configuration information for the second IAB node.

For example, if the IAB donor CU includes a CP and a UP, the IAB donor CU-CP may configure the sixth configuration information for the second IAB node.

The sixth configuration information is used to configure packet header information correspondingly added to a sixth data payload that needs to be transmitted by the second IAB node. The sixth data payload may be an F1 control plane (F1-C) message, that is, an F1AP message, between the second IAB node and the IAB donor (which may be specifically the IAB donor CU or the IAB donor CU-CP). The packet header information is a field in an IP packet header, and specifically includes differentiated service information and/or a flow label.

In a possible implementation, the sixth configuration information specifically includes any one or more of the following content:

first differentiated service information and/or a first flow label specified for a UE associated F1AP message and second differentiated service information and/or a second flow label specified for a non-UE associated F1AP message.

In another possible implementation, the sixth configuration information specifically includes any one or more of the following content:

an identifier of a first terminal device, the first differentiated service information and/or the first flow label specified for the UE associated F1AP message of the first terminal device, and the second differentiated service information and/or the second flow label specified for the non-UE associated F1AP message.

Based on the sixth configuration information, after obtaining an uplink data packet including the sixth data payload, the second IAB node determines, based on an F1AP message type corresponding to the sixth data payload, differentiated service information and/or a flow label that is to be added to the IP packet header, and then sends, to a next-hop node, the uplink data packet to which the differentiated service information and/or the flow label are/is added. For details, refer to descriptions of step 1201 to step 1203.

Optionally, this embodiment of this application further includes the following steps.

Step 1201: The second IAB node obtains the sixth data payload. Specifically, the second IAB node may generate the sixth data payload.

Step 1202: The second IAB node determines the differentiated service information and/or the flow label corresponding to the sixth data payload.

The second IAB node may determine, based on the F1AP message type (for example, the non-UE associated F1AP message or the UE associated F1AP message) corresponding to the sixth data payload, the differentiated service information and/or the flow label corresponding to the sixth data payload, or when the sixth data payload is the UE associated F1AP message, the second IAB node may determine, based on the identifier that is of the first terminal device and that corresponds to the sixth data payload, the differentiated service information and/or the flow label corresponding to the sixth data payload. Specifically, when the sixth data payload is the non-UE associated F1AP message, the sixth data payload corresponds to the second differentiated service information and/or the second flow label, or when the sixth data payload is the UE associated F1AP message, the sixth data payload corresponds to the first differentiated service information and/or the first flow label. Alternatively, when the sixth data payload is the UE associated F1AP message of the first terminal device, the sixth data payload corresponds to the first differentiated service information and/or the first flow label.

Step 1203: The second IAB node sends a sixth data packet to a parent node.

The sixth data packet includes the sixth data payload and an IP packet header, and the IP packet header includes the differentiated service information and/or the flow label that correspond/corresponds to the sixth data payload and that are/is determined in step 1202. Optionally, the second IAB node may determine, based on the differentiated service information and/or the flow label included in the sixth data packet, an egress BH RLC channel used to send the sixth data packet.

In the foregoing process, the second IAB node adds different differentiated service information and/or flow label values to different types of F1AP messages based on the sixth configuration information, so that the second IAB node can determine, based on BH RLC channels corresponding to the differentiated service information and/or the flow label values, the BH RLC channels used to send the F1AP messages, to provide differentiated QoS guarantee for the different types of F1-C messages.

Embodiment 7

In an existing dual connectivity scenario, UE is connected to both a master node (MN) and a secondary node (SN). The MN and the SN may use a same access standard (for example, both the MN and the SN use an LTE standard or an NR standard), or may use different access standards (for example, the MN uses an LTE standard, and the SN uses an NR standard, or the MN uses an NR standard, and the SN uses an LTE standard). A master cell group (MCG) includes a serving cell associated with the MN, and includes at least one primary cell PCell, and optionally includes one or more secondary cells SCells. Similarly, a secondary cell group (SCG) includes a serving cell associated with the SN, and includes at least one primary cell (e.g. primary secondary cell (PSCell)), and optionally includes one or more secondary cells SCells. An MCG link is a single-hop access link between the UE and the MN, and an SCG link is a single-hop access link between the UE and the SN.

When the UE finds that a radio link failure (RLF) occurs on the MCG link between the UE and the MN, the UE triggers an RRC connection re-establishment process to recover the MCG link. When the UE finds that an RLF occurs on the SCG link between the UE and the SN, the UE does not trigger an RRC connection re-establishment process, but sends an SCG failure report to the MN by using the MCG, so that the MN triggers an SCG failure recovery process to recover the SCG link, for example, triggers an SCG change process. In 3GPP Release 16, existing DC is enhanced, and an MCG fast recovery mechanism is introduced. To be specific, when the UE finds that an RLF occurs on the MCG link between the UE and the MN, the UE uses a mechanism similar to an SCG failure mechanism, no longer triggers an RRC connection re-establishment process, but sends an MCG failure report by using the SCG.

In an IAB scenario, an IAB node can work in standalone (standalone, SA) mode or non-standalone (NSA) mode based on EN-DC (E-UTRAN NR Dual Connectivity).

Figure 13:
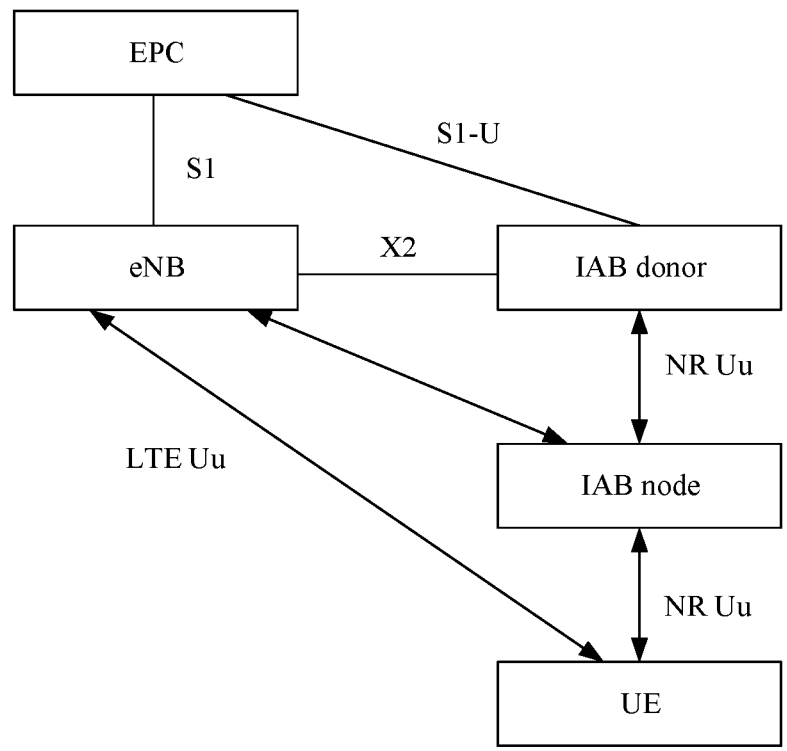
FIG. 13 is a schematic diagram of a network architecture in a non-standalone mode according to an embodiment of this application.

In this embodiment, it is mainly considered that the IAB node works in NSA mode. As shown in FIG. 13, an MN that provides a service for the IAB node is an eNB, and an SN that provides a service for the IAB node is an IAB donor. The MN uses an LTE standard, and the SN uses an NR standard. Similarly, an MCG link is a link between the IAB node (that is, an IAB node MT) and the MN, and an SCG link is a link between the IAB node (that is, the IAB node MT) and the SN.

When the IAB node detects that an RLF occurs on the SCG link between the IAB node and the IAB donor, the IAB node sends, through the MCG link, an SCG failure report to the eNB that provides a service for the IAB node, so that the eNB triggers an SCG failure recovery process to recover the SCG link.

When the SCG link fails to be recovered or cannot be recovered (for example, an SCG change fails or SCG release is performed), the IAB node needs to send one piece of RLF indication information to a child node of the IAB node, so that the child node of the IAB node performs corresponding processing. In a possible implementation, when the child node of the IAB node receives the RLF indication information sent by the IAB node, the child node of the IAB node sends, by using an MCG, an SCG failure report to an eNB that provides a service for the child node. The child node of the IAB node may be UE or another IAB node. The eNB that provides a service for the IAB node may be the same as or different from the eNB that provides a service for the child node of the IAB node. This is not limited in this embodiment.

It should be noted that this embodiment is also applicable to an IAB multi-hop scenario. To be specific, there may be another IAB node on a link between the IAB node and the donor node, that is, a scenario in which the IAB node is connected to the donor node by using the another IAB node. Details are not described herein.

The embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) that may be used in the terminal device, and the methods and the operations implemented by the network device may alternatively be implemented by a component (for example, a chip or a circuit) that may be used in the network device.

The foregoing mainly describes, from a perspective of interaction between network elements, solutions provided in this application. It may be understood that, to implement the foregoing functions, each network element includes a corresponding hardware structure and/or software module for implementing each function. A person skilled in the art should be easily aware that units, algorithms, and steps in the examples described with reference to the embodiments disclosed in this specification can be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 14:
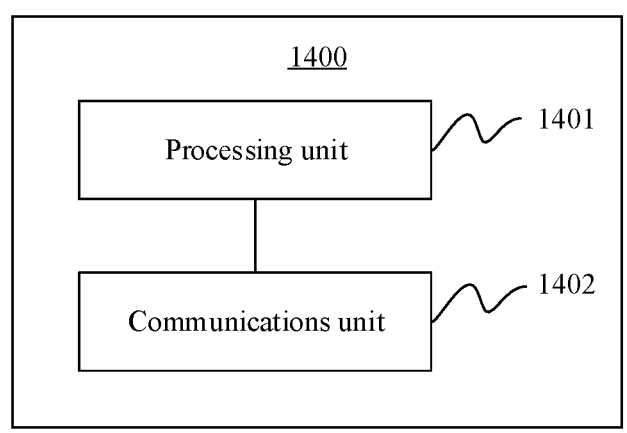
FIG. 14 is a schematic diagram of a structure of a communications apparatus according to an embodiment of this application.

FIG. 14 is a possible example block diagram of a communications apparatus according to this application. The apparatus 1400 may exist in a form of software or hardware. The apparatus 1400 may include a processing unit 1401 and a communications unit 1402. In an implementation, the communications unit 1402 may include a receiving unit and a sending unit. The processing unit 1401 is configured to: control and manage actions of the apparatus 1400. The communications unit 1402 is configured to support the apparatus 1400 in communicating with another network entity.

When the apparatus 1400 is configured to implement functions of the IAB donor in the method embodiment shown in FIG. 4, the following operations are performed:

The processing unit is configured to determine first configuration information, where the first configuration information is used to indicate a first backhaul link BH radio link control RLC channel, and the first BH RLC channel is used to transmit a control protocol data unit PDU at a backhaul adaptation protocol BAP layer.

The communications unit is configured to send the first configuration information to an IAB node.

In a possible implementation, the first configuration information includes a channel identifier of the first BH RLC channel; or the first configuration information includes a logical channel identifier, and a logical channel indicated by the logical channel identifier corresponds to the first BH RLC channel.

When the apparatus 1400 is configured to implement functions of the IAB node in the method embodiment shown in FIG. 4, the following operations are performed:

The processing unit is configured to determine a first backhaul link BH radio link control RLC channel used to transmit a control protocol data unit PDU at a BAP layer.

The communications unit is configured to send the control PDU at the BAP layer to an adjacent node of the IAB node through the first BH RLC channel.

In a possible implementation, the processing unit is specifically configured to:

obtain first configuration information from an IAB donor, where the first configuration information is used to indicate the first BH RLC channel used to transmit the control PDU at the BAP layer; and determine the first BH RLC channel based on the first configuration information.

In a possible implementation, the first configuration information includes a channel identifier of the first BH RLC channel; or the first configuration information includes a logical channel identifier, and a logical channel indicated by the logical channel identifier corresponds to the first BH RLC channel.

When the apparatus 1400 is configured to implement functions of the IAB donor in the method embodiment shown in FIG. 5, the following operations are performed:

The processing unit is configured to determine second configuration information, where the second configuration information is used to indicate a second backhaul link BH radio link control RLC channel, the second BH RLC channel is used to transmit a first-type data payload, and the first-type data payload is a data payload other than an F1 user plane F1-U data payload and an F1 control plane F1-C data payload.

The communications unit is configured to send the second configuration information to an IAB node.

In a possible implementation, the first-type data payload includes any one of the following:

an operation, administration, and maintenance OAM traffic packet;

a packet used to request an internet protocol IP address;

a packet used to establish an internet protocol security IPsec transmission channel;

a stream control transport protocol SCTP association setup packet;

an SCTP association shutdown packet; and an SCTP association heartbeat packet.

In a possible implementation, the second configuration information includes any one or more of the following:

a first type, where the first type is a type of a data payload, and the first type corresponds to the second BH RLC channel;

first differentiated service information, where the first differentiated service information corresponds to the first type and/or the second BH RLC channel; and a first flow label, where the first flow label corresponds to the first type and/or the second BH RLC channel.

In a possible implementation, the processing unit is further configured to:

generate a first data payload, where the first data payload is the first-type data payload; and if packet header information corresponding to the first data payload carries the first differentiated service information, the communications unit is further configured to send a first data packet to the IAB node through the second BH RLC channel corresponding to the first differentiated service information; or if packet header information corresponding to the first data payload carries the first flow label, the communications unit is further configured to send a first data packet to the IAB node through the second BH RLC channel corresponding to the first flow label, where the first data packet includes the first data payload.

In a possible implementation, the second configuration information includes identification information used to identify the second BH RLC channel, and the identification information is a channel identifier of the second BH RLC channel, or the identification information is a logical channel identifier corresponding to the second BH RLC channel.

When the apparatus 1400 is configured to implement functions of the IAB node in the method embodiment shown in FIG. 5, the following operations are performed:

The communications unit is configured to receive second configuration information from an IAB donor, where the second configuration information is used to indicate a second backhaul link BH radio link control RLC channel, the second BH RLC channel is used to transmit a first-type data payload, and the first-type data payload is a data payload other than an F1 user plane F1-U data payload and an F1 control plane F1-C data payload.

The processing unit is configured to transmit the first-type data payload based on the second configuration information.

In a possible implementation, the first-type data payload includes any one of the following:
- an operation, administration, and maintenance OAM traffic packet;
- a packet used to request an internet protocol IP address;
- a packet used to establish an internet protocol security IPsec transmission channel;
- a stream control transport protocol SCTP association setup packet;
- an SCTP association shutdown packet; and
- an SCTP association heartbeat packet.

In a possible implementation, the second configuration information includes any one or more of the following:
- a first type, where the first type is a type of a data payload, and the first type corresponds to the second BH RLC channel;
- first differentiated service information, where the first differentiated service information corresponds to the first type and/or the second BH RLC channel; and
- a first flow label, where the first flow label corresponds to the first type and/or the second BH RLC channel.

In a possible implementation, the second configuration information includes identification information used to identify the second BH RLC channel, and the identification information is a channel identifier of the second BH RLC channel, or the identification information is a logical channel identifier corresponding to the second BH RLC channel.

The apparatus 1400 may further implement functions of the IAB donor in the method embodiment shown in FIG. 7, the apparatus 1400 may further implement functions of the second IAB node in the method embodiment shown in FIG. 10, the apparatus 1400 may further implement functions of the first IAB node in the method embodiment shown in FIG. 11, and the apparatus 1400 may further implement functions of the second IAB node in the method embodiment shown in FIG. 12. For details, refer to the foregoing descriptions. The details are not described herein again.

Figure 15:
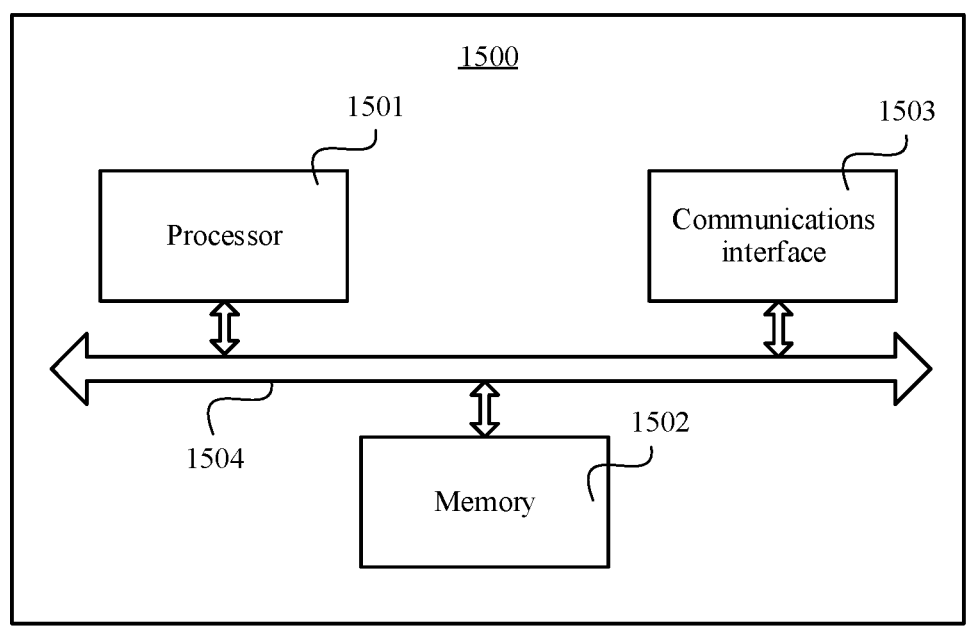
FIG. 15 is a schematic diagram of a structure of a communications apparatus according to an embodiment of this application.

FIG. 15 shows an apparatus 1500 according to an embodiment of this application. The apparatus shown in FIG. 15 may be an implementation of a hardware circuit of the apparatus shown in FIG. 14. The communications apparatus may be used in the flowchart shown above, and performs functions of the IAB node or the IAB donor in the foregoing method embodiments. For ease of description, FIG. 15 shows only main components of the communication apparatus.

The apparatus 1500 shown in FIG. 15 includes at least one processor 1501. For example, the processor 1501 may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The apparatus 1500 may further include at least one memory 1502, configured to store program instructions and/or data. The memory 1502 is coupled to the processor 1501. The coupling in this embodiment of this application is indirect coupling or a communication connection between apparatuses, units, or modules for information exchange between the apparatuses, the units, or the modules, and may be in electrical, mechanical, or other forms. The processor 1501 may operate in collaboration with the memory 1502. The processor 1501 may execute the program instructions stored in the memory 1502. At least one of the at least one memory may be included in the processor.

The apparatus 1500 may further include a communications interface 1503, configured to communicate with another device through a transmission medium, so that an apparatus in the apparatus 1500 can communicate with the another device. In this embodiment of this application, the communications interface may be a transceiver, a circuit, a bus, a module, or a communications interface of another type. In this embodiment of this application, the transceiver may be an independent receiver, an independent transmitter, a transceiver integrated with a transceiver function, or an interface circuit.

The apparatus 1500 may further include a communications line 1504. The communications interface 1503, the processor 1501, and the memory 1502 may be connected to each other through the communications line 1504. The communications line 1504 may be a peripheral component interconnect (PCI) bus, an extended industry standard architecture (EISA) bus, or the like. The communications line 1504 may be classified into an address bus, a data bus, a control bus, and the like. For ease of representation, only one thick line is used to represent the communications line in FIG. 15, but this does not mean that there is only one bus or only one type of bus.

The apparatus 1500 may implement functions of the IAB node or the IAB donor in the method embodiment shown in FIG. 4, the apparatus 1500 may further implement functions of the IAB node or the IAB donor in the method embodiment shown in FIG. 5, the apparatus 1500 may further implement functions of the IAB donor in the method embodiment shown in FIG. 7, the apparatus 1500 may further implement functions of the second IAB node in the method embodiment shown in FIG. 10, the apparatus 1500 may further implement functions of the first IAB node in the method embodiment shown in FIG. 11, and the apparatus 1500 may further implement functions of the second IAB node in the method embodiment shown in FIG. 12. For details, refer to the foregoing descriptions. The details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the claims of this application and equivalent technologies thereof.

What is claimed is:

1. A data packet transmission method, comprising:
   determining, by an integrated access and backhaul (IAB) donor, configuration information indicating a backhaul link (BH) radio link control (RLC) channel for transmitting a corresponding packet, and the corresponding packet is a control protocol data unit (PDU) at a backhaul adaptation protocol (BAP) layer or comprise a data payload other than an F1 user plane (F1-U) data payload and an F1 control plane (F1-C) data payload; and
   sending, by the IAB donor, the configuration information to an IAB node,
   wherein the configuration information comprises a channel identifier of the BH RLC channel for transmitting the corresponding packet; or
   the configuration information comprises a logical channel identifier, and a logical channel indicated by the logical channel identifier corresponds to the BH RLC channel for transmitting the corresponding packet.

2. The method according to claim 1, wherein the corresponding packet comprising the data payload other than the F1-U data payload and the F1-C data payload comprises at least one of the following:
   an operation, administration, and maintenance (OAM) traffic packet;
   a packet used to request an internet protocol (IP) address;
   a packet used to establish an internet protocol security (IPsec) transmission channel;
   a stream control transport protocol (SCTP) association setup packet;
   an SCTP association shutdown packet; or
   an SCTP association heartbeat packet.

3. The method according to claim 1, wherein the corresponding packet comprises the data payload other than the F1-U data payload and the F1-C data payload, and the configuration information comprises information indicating a data payload type of the packet corresponding to the BH RLC channel.

4. A data packet transmission method, comprising:
   receiving, by an integrated access and backhaul (IAB) node from an IAB donor, configuration information indicating a backhaul link (BH) radio link control (RLC) channel for transmitting a corresponding packet, and the corresponding packet is a control protocol data unit (PDU) at a backhaul adaptation protocol (BAP) layer or comprises a data payload other than an F1 user plane (F1-U) data payload and an F1 control plane (F1-C) data payload;
   determining, by the IAB node based on the configuration information, the BH RLC channel for transmitting the corresponding packet; and
   sending, by the IAB node, the corresponding packet to an adjacent node of the IAB node through the BH RLC channel,
   wherein the configuration information comprises a channel identifier of the BH RLC channel for transmitting the corresponding packet; or
   the configuration information comprises a logical channel identifier, and a logical channel indicated by the logical channel identifier corresponds to the BH RLC channel for transmitting the corresponding packet.

5. The method according to claim 4, wherein the corresponding packet comprising the data payload other than the F1-U data payload and the F1-C data payload comprises at least one of the following:
   an operation, administration, and maintenance (OAM) traffic packet;
   a packet used to request an internet protocol (IP) address;
   a packet used to establish an internet protocol security (IPsec) transmission channel;
   a stream control transport protocol (SCTP) association setup packet;
   an SCTP association shutdown packet; or
   an SCTP association heartbeat packet.

6. The method according to claim 4, wherein the corresponding packet comprises the data payload other than the F1-U data payload and the F1-C data payload, and the configuration information comprises information indicating a data payload type of the packet corresponding to the BH RLC channel.

7. An integrated access and backhaul (IAB) donor, comprising at least one processor and at least one memory storing instruction; wherein the instructions, when executed by the at least one processor, cause the IAB donor to perform operations of:
   determining configuration information indicating a backhaul link (BH) radio link control (RLC) channel for transmitting a corresponding packet, and the corresponding packet is a control protocol data unit (PDU) at a backhaul adaptation protocol (BAP) layer or comprises a data payload other than an F1 user plane (F1-U) data payload and an F1 control plane (F1-C) data payload; and
   sending the configuration information to an IAB node,
   wherein the configuration information comprises a channel identifier of the BH RLC channel for transmitting the corresponding packet; or
   the configuration information comprises a logical channel identifier, and a logical channel indicated by the logical channel identifier corresponds to the BH RLC channel for transmitting the corresponding packet.

8. The IAB donor according to claim 7, wherein the corresponding packet comprising the data payload other than the F1-U data payload and the F1-C data payload comprises at least one of the following:
- an operation, administration, and maintenance (OAM) traffic packet;
- a packet used to request an internet protocol (IP) address;
- a packet used to establish an internet protocol security (IPsec) transmission channel;
- a stream control transport protocol (SCTP) association setup packet;
- an SCTP association shutdown packet; or
- an SCTP association heartbeat packet.

9. The IAB donor according to claim 7, wherein the corresponding packet comprises the data payload other than the F1-U data payload and the F1-C data payload, and the configuration information comprises information indicating a data payload type of the packet corresponding to the BH RLC channel.

10. An integrated access and backhaul (IAB) node, comprising at least one processor and at least one memory storing instructions; wherein the instruction, when executed by the at least one processor, cause the IAB node perform to operations of:
- receiving from an IAB donor, configuration information indicting a backhaul link (BH) radio control (RLC) channel for transmitting a corresponding packet, and the corresponding packet is a control protocol data unit (PDU) at a backhaul adaptation protocol (BAP) layer or comprises a data payload other than an F1 user plane (F1-U) data payload and an F1 control plane (F1-C) data payload;
- determining based on the configuration information, the BH RLC channel for transmitting the corresponding packet; and
- sending the corresponding packet to an adjacent node of the IAB node through the BH RLC channel,
- wherein the configuration information comprises a channel identifier of the BH RLC channel for transmitting the corresponding packet; or
- the configuration information comprises a logical channel identifier, and a logical channel indicated by the logical channel identifier corresponds to the BH RLC channel for transmitting the corresponding packet.

11. The IAB node according to claim 10, wherein the corresponding packet comprising the data payload other than the F1-U data payload and the F1-C data payload comprises at least one of the following:
- an operation, administration, and maintenance (OAM) traffic packet;
- a packet used to request an internet protocol (IP) address;
- a packet used to establish an internet protocol security (IPsec) transmission channel;
- a stream control transport protocol (SCTP) association setup packet;
- an SCTP association shutdown packet; or
- an SCTP association heartbeat packet.

12. The IAB node according to claim 10, wherein the corresponding packet comprises the data payload other than the F1-U data payload and the F1-C data payload, and the configuration information comprises information indicating a data payload type of the packet corresponding to the BH RLC channel.

13. A communication system, comprising an integrated access and backhaul (IAB) donor and an IAB node;
- wherein the IAB donor is configured to determine configuration information indicating a backhaul link (BH) radio link control (RLC) channel for transmitting a corresponding packet and send the configuration information to an IAB node; wherein the corresponding packet is a control protocol data unit (PDU) at a backhaul adaptation protocol (BAP) layer or comprises a data payload other than an F1 user plane (F1-U) data payload and an F1 control plane (F1-C) data payload; and
- the IAB node is configured to receive from the IAB donor, the configuration information, determine based on the configuration information, the BH RLC channel for transmitting the corresponding packet and send the corresponding packet to an adjacent node of the IAB node through the BH RLC channel,
- wherein the configuration information comprises a channel identifier of the BH RLC channel for transmitting the corresponding packet; or
- the configuration information comprises a logical channel identifier, and a logical channel indicated by the logical channel identifier corresponds to the BH RLC channel for transmitting the corresponding packet.

14. The system according to claim 13, wherein the corresponding packet comprising the data payload other than the F1-U data payload and the F1-C data payload comprises at least one of the following:
- an operation, administration, and maintenance (OAM) traffic packet;
- a packet used to request an internet protocol (IP) address;
- a packet used to establish an internet protocol security (IPsec) transmission channel;
- a stream control transport protocol (SCTP) association setup packet;
- an SCTP association shutdown packet; or
- an SCTP association heartbeat packet.

15. The system according to claim 13, wherein the corresponding packet comprises the data payload other than the F1-U data payload and the F1-C data payload, and the configuration information comprises information indicating a data payload type of the packet corresponding to the BH RLC channel.

* * * * *

UNITED STATES PATENT AND TRADEMARK OFFICE
CERTIFICATE OF CORRECTION

PATENT NO. : 12,219,458 B2  
APPLICATION NO. : 17/708767  
DATED : February 4, 2025  
INVENTOR(S) : Yuanping Zhu et al.

Page 1 of 1

It is certified that error appears in the above-identified patent and that said Letters Patent is hereby corrected as shown below:

In the Claims

In Column 33, In Line 42, In Claim 1, delete "comprise" and insert -- comprises --.

In Column 33, In Line 44, In Claim 1, after "(F1-C" insert -- ) --.

In Column 34, In Line 51, In Claim 7, delete "instruction;" and insert -- instructions; --.

In Column 35, In Line 24 (Approx.), In Claim 10, delete "instruction," and insert -- instructions, --.

In Column 35, In Line 28 (Approx.), In Claim 10, delete "indicting" and insert -- indicating --.

In Column 35, In Line 28 (Approx.), In Claim 1, after "radio" insert -- link --.

Signed and Sealed this  
Fifteenth Day of July, 2025

Coke Morgan Stewart  
*Acting Director of the United States Patent and Trademark Office*